is011029484B2

United States Patent
Sugiyama

(10) Patent No.: US 11,029,484 B2
(45) Date of Patent: Jun. 8, 2021

(54) IMAGING APPARATUS, INTERCHANGEABLE LENS, INTERMEDIATE ACCESSORY, AND CONTROL METHODS THEREFOR

(71) Applicant: CANON KABUSHIKI KAISHA, Tokyo (JP)

(72) Inventor: Kazumichi Sugiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 15/992,904

(22) Filed: May 30, 2018

(65) Prior Publication Data

US 2018/0348475 A1 Dec. 6, 2018

(30) Foreign Application Priority Data

May 31, 2017 (JP) .............................. JP2017-108271
May 8, 2018 (JP) .............................. JP2018-090216

(51) Int. Cl.
| | | |
|---|---|---|
| *G02B 27/00* | (2006.01) | |
| *G02B 7/14* | (2021.01) | |
| *G03B 17/14* | (2021.01) | |
| *G03B 17/56* | (2021.01) | |
| *G03B 7/20* | (2021.01) | |
| *H04N 5/232* | (2006.01) | |

(52) U.S. Cl.
CPC ............ *G02B 7/14* (2013.01); *G02B 27/0037* (2013.01); *G03B 7/20* (2013.01); *G03B 17/14* (2013.01); *G03B 17/56* (2013.01); *H04N 5/23248* (2013.01); *H04N 5/23296* (2013.01)

(58) Field of Classification Search
CPC ........ G02B 7/14; G02B 27/0037; G03B 7/20; G03B 17/14; G03B 17/56; H04N 5/23296
USPC ........................................................ 359/827
See application file for complete search history.

(56) References Cited

U.S. PATENT DOCUMENTS

| | | | |
|---|---|---|---|
| 2010/0091175 A1 | 4/2010 | Shintani et al. | |
| 2013/0002942 A1* | 1/2013 | Motoki | G03B 17/02 348/372 |
| 2013/0010134 A1* | 1/2013 | Motoki | H04N 5/23241 348/207.99 |
| 2013/0010185 A1* | 1/2013 | Motoki | G03B 17/02 348/375 |
| 2013/0028590 A1 | 1/2013 | Hasuda et al. | |
| 2013/0077954 A1 | 3/2013 | Oikawa et al. | |
| 2014/0184896 A1* | 7/2014 | Imafuji | G03B 7/16 348/371 |

FOREIGN PATENT DOCUMENTS

| | | |
|---|---|---|
| CN | 103581546 A | 2/2014 |
| CN | 104272181 A | 1/2015 |
| JP | 2003015011 A | 1/2003 |
| JP | 5208169 B2 | 6/2013 |

* cited by examiner

*Primary Examiner* — James R Greece
(74) *Attorney, Agent, or Firm* — Canon U.S.A., Inc. I.P. Division

(57) ABSTRACT

A camera control unit obtains information related to an optical correction of an interchangeable lens from an intermediate accessory by a second communication via a second communication path. The camera control unit controls a communication in a manner that the above-described information is used for the optical correction of the interchangeable lens.

50 Claims, 13 Drawing Sheets

FIG. 10A

| CAMERA → LENS (FIRST COMMUNICATION) |
|---|
| IDENTIFICATION INFORMATION REQUEST |

FIG. 10B

| LENS → CAMERA (FIRST COMMUNICATION) |
|---|
| IDENTIFICATION INFORMATION |

FIG. 10C

| CAMERA → ACCESSORY (SECOND COMMUNICATION) | |
|---|---|
| AUTHENTICATION INFORMATION REQUEST | IDENTIFICATION INFORMATION REQUEST |
| | CORRECTION PROCESSING NECESSITY/ UNNECESSITY INFORMATION REQUEST |
| | TERMINATION INFORMATION REQUEST |

FIG. 10D

| ACCESSORY → CAMERA (SECOND COMMUNICATION) (INTERMEDIATE ACCESSORY) | |
|---|---|
| AUTHENTICATION INFORMATION | IDENTIFICATION INFORMATION |
| | CORRECTION PROCESSING NECESSITY/ UNNECESSITY INFORMATION |
| | TERMINATION INFORMATION |

FIG. 10E

| ACCESSORY → CAMERA (SECOND COMMUNICATION) (INTERCHANGEABLE LENS) | |
|---|---|
| AUTHENTICATION INFORMATION | IDENTIFICATION INFORMATION |
| | CORRECTION PROCESSING NECESSITY/ UNNECESSITY INFORMATION (UNNECESSARY) |
| | TERMINATION INFORMATION (HERE IS TERMINATION) |

IMAGING APPARATUS, INTERCHANGEABLE LENS, INTERMEDIATE ACCESSORY, AND CONTROL METHODS THEREFOR

BACKGROUND OF THE INVENTION

Field of the Invention

The present invention relates to an imaging apparatus in a camera system constituted by an imaging apparatus, one or more intermediate accessories, and an interchangeable lens which mutually perform communication. This invention also relates to an interchangeable lens, an intermediate accessory, and the like.

Description of the Related Art

A camera main body (which is also referred to as an imaging apparatus) which performs a photographing process, image recording, and interchangeable lens control, has been proposed as a camera system including a camera main body and an interchangeable lens. In addition, a technology with which the interchangeable lens performs focus driving or aperture driving in accordance with a control instruction from the camera main body in this camera system has been proposed.

To appropriately perform the focus driving or the aperture driving in the above-described camera system, the camera main body needs to obtain optical information intrinsic to the interchangeable lens (for example, information such as a focal length, an aperture, a focus sensitivity, or a focus correction amount) from the interchangeable lens. The camera main body may previously hold the optical information of the interchangeable lens in some cases, and the optical information may also be obtained from the interchangeable lens via communication in other cases.

In addition, an intermediate accessory may be attached between the camera main body and the interchangeable lens in some cases in the camera system including the camera main body and the interchangeable lens. For example, a magnification varying lens such as a wide converter or a tele converter that changes a focal length of the interchangeable lens, an accessory for attaching a neutral density (ND) filter or the like that changes a transmittance, and an accessory with which it is possible to attach the interchangeable lens of a different type, are conceivable as the intermediate accessory.

To appropriately perform the focus driving or the aperture driving in a case where the above-described intermediate accessories that change optical characteristics or the like are attached, not only the optical information of the interchangeable lens but also optical information intrinsic to the intermediate accessory need to be taken into account. Specifically, the optical information of the interchangeable lens or the like needs to be corrected on the basis of the optical information of the intermediate accessory.

Japanese Patent No. 5208169 describes a technology for correcting optical information of the interchangeable lens by taking into account the optical characteristics of the intermediate accessory. The intermediate accessory according to Japanese Patent No. 5208169 includes a central processing unit (CPU) therein. The CPU determines whether or not the interchangeable lens is new with respect to the intermediate accessory on the basis of identification information obtained from the interchangeable lens. In a case where the interchangeable lens is newer than the intermediate accessory (that is, the time when the interchangeable lens is designed is later than that of the intermediate accessory), the intermediate accessory does not include the optical information of the interchangeable lens. Therefore, the identification information and the optical information of the intermediate accessory are transmitted to cause the interchangeable lens itself to perform correction processing of the optical information of the interchangeable lens. On the other hand, in a case where it is determined that the interchangeable lens is older than the intermediate accessory, the intermediate accessory has the optical information of the interchangeable lens. Therefore, the intermediate accessory performs the correction processing of the optical information of the interchangeable lens.

According to Japanese Patent No. 5208169, even in a case where the intermediate accessory having a new design is combined with a dated camera main body having an old design (function) and the camera main body or the interchangeable lens does not hold the optical information of the intermediate accessory, it is possible to perform the correction processing of the optical information of the interchangeable lens.

However, an issue occurs in the communication system described in Japanese Patent No. 5208169.

For example, according to the descriptions in Japanese Patent No. 5208169, while a communication is performed between the intermediate accessory and the camera main body, an interchangeable lens control signal is not transmitted to an interchangeable lens at an intended timing. When the interchangeable lens control signal is not immediately transmitted to the interchangeable lens at a timing intended by the camera main body, a plurality of optical members implemented in the interchangeable lens are not controlled at a high speed and a high accuracy in some cases.

SUMMARY OF THE INVENTION

In recent years, the data amount of lens information obtained by the camera main body from the interchangeable lens tends to increase due to sophistication in imaging control. Furthermore, needs for communicating a large amount of data in short time due to shortening of an imaging period (that is, increase in a frame rate) have arisen. For this reason, a technology for performing the communication at the more appropriately intended timing between the respective units of the imaging apparatus, the interchangeable lens, and the intermediate accessory is still further demanded.

In view of the above, the present invention aims at providing an imaging apparatus that appropriately corrects the optical information of the interchangeable lens and can perform at the more appropriately intended timing between the respective units of the imaging apparatus, the interchangeable lens, and the intermediate accessory. The present invention also aims at providing an interchangeable lens, and an intermediate accessory. In addition, the present invention aims at providing control methods therefor.

According to an aspect of the present invention, there is provided an imaging apparatus to which an interchangeable lens and an intermediate accessory, which is attachable between the interchangeable lens and the imaging apparatus, are attachable, the imaging apparatus including a first communication control unit configured to control a first communication via a first communication path where it is possible to mutually communicate with the interchangeable lens, a second communication control unit configured to control a second communication via a second communication path where it is possible to mutually communicate with the intermediate accessory, an obtaining unit configured to obtain information from the interchangeable lens and the intermediate accessory, a storage unit configured to store the information obtained by the obtaining unit, and a determination unit configured to determine a unit, from among the imaging apparatus, the interchangeable lens, and the intermediate accessory which performs a correction of optical information of the interchangeable lens, in which the first communication control unit is configured to transmit first instruction information to the interchangeable lens via the first communication path and obtain first information including identification information of the interchangeable lens from the interchangeable lens as a response, the second communication control unit is configured to transmit second instruction information to the intermediate accessory via the second communication path and obtain second information including identification information of the intermediate accessory and information indicating whether or not the correction of the optical information of the interchangeable lens is necessary as a response, and the determination unit determines the unit, from among the imaging apparatus, the interchangeable lens, and the intermediate accessory which performs the correction of the optical information of the interchangeable lens on the basis of the first information and the second information.

In addition, according to another aspect of the present invention, there is provided an interchangeable lens attachable to an intermediate accessory, which is attachable to an imaging apparatus, the interchangeable lens including a first communication control unit configured to control a first communication via a first communication path where it is possible to mutually communicate with the imaging apparatus, a second communication control unit configured to control a second communication via a second communication path where it is possible to mutually communicate with the imaging apparatus via the intermediate accessory, and a storage unit configured to store identification information of the interchangeable lens and optical information of the interchangeable lens, in which the first communication control unit is configured to transmit information including identification information of the interchangeable lens to the imaging apparatus in response to first instruction information obtained from the imaging apparatus, and the second communication control unit is configured to transmit information indicating that a relevant accessory from among a plurality of accessories including the interchangeable lens and the intermediate accessory is a termination of the second communication in response to second instruction information obtained from the imaging apparatus.

Moreover, according to another aspect of the present invention, there is provided an intermediate accessory attachable between an imaging apparatus and an interchangeable lens, the intermediate accessory including a communication control unit configured to control a communication via a communication path where it is possible to mutually communicate with the imaging apparatus, and a storage unit configured to store identification information and optical information of the intermediate accessory, in which the communication control unit is configured to transmit the identification information of the intermediate accessory and information indicating whether or not a correction of the optical information of the interchangeable lens is necessary to the imaging apparatus by the communication in response to first instruction information obtained from the imaging apparatus.

In addition, according to another aspect of the present invention, there is provided an imaging apparatus to which an interchangeable lens and an intermediate accessory, which is attachable between the interchangeable lens and the imaging apparatus, are attachable, the imaging apparatus including a first communication terminal configured to transmit information to the interchangeable lens, a second communication terminal configured to obtain information from the intermediate accessory, and a communication control unit configured to obtain, in accordance with transmission of information for requesting information related to a method for a correction of optical information of the interchangeable lens and information related to a parameter for the correction via the second communication terminal, the information related to the method for the correction and the information related to the parameter for the correction from the intermediate accessory and transmit the information related to the method for the correction and the information related to the parameter for the correction to the interchangeable lens via the first communication terminal.

Moreover, according to another aspect of the present invention, there is provided an intermediate accessory which is attachable between an imaging apparatus and an interchangeable lens, the intermediate accessory including a first communication terminal through which information transmitted from the imaging apparatus to the interchangeable lens passes, a second communication terminal configured to transmit a response with respect to a request received from the imaging apparatus, and a communication control unit configured to transmit information related to a method for a correction of optical information of the interchangeable lens and information related to a parameter for the correction via the second communication terminal, in which the information related to the method for the correction and the information related to the parameter for the correction pass through the first communication terminal.

Furthermore, according to another aspect of the present invention, there is provided an interchangeable lens which is attachable to an intermediate accessory attached to an imaging apparatus, the interchangeable lens including a first communication terminal configured to receive information transmitted from the imaging apparatus, a third communication terminal configured to transmit information to the imaging apparatus, a communication control unit configured to control a communication in a manner that information related to a method for a correction of optical information of the interchangeable lens which is transmitted to the imaging apparatus and information related to a parameter for the correction are received via the first communication terminal, and a correction unit configured to correct optical information on a basis of the information related to the method for the correction and the information related to the parameter for the correction, in which the communication control unit controls the communication in a manner that the optical information corrected by the correction unit is transmitted via the third communication terminal.

Further features of the present invention will become apparent from the following description of exemplary embodiments with reference to the attached drawings.

BRIEF DESCRIPTION OF THE DRAWINGS

FIGS. 10A to 10E illustrate examples of information communicated in the initial communication.

DESCRIPTION OF THE EMBODIMENTS

Hereinafter, descriptions of will be given with reference to the drawings to which exemplary embodiments of the present invention are applied. Hereinafter, an accessory refers to an interchangeable lens or an intermediate accessory. Each of the embodiments of the present invention described below can be implemented solely or as a combination of a plurality of the embodiments or features thereof where necessary or where the combination of elements or features from individual embodiments in a single embodiment is beneficial.

It should be noted that, in the following exemplary embodiments, each of a camera main body, the interchangeable lens, and the intermediate accessory will also be collectively referred to as a unit. Each of the interchangeable lens and the intermediate accessory will also be collectively referred to as an accessory.

In addition, in the following exemplary embodiments, an accessory related to a correction refers to the interchangeable lens or the intermediate accessory in which correction processing necessity/unnecessity information is "necessary".

In addition, in the following exemplary embodiments, an intermediate accessory related to a correction refers to the intermediate accessory in which a correction of the optical information of the interchangeable lens is necessary.

In addition, in the following exemplary embodiments, a first accessory refers to an accessory that holds optical information of all of the other accessories.

In addition, in the following exemplary embodiments, a first intermediate accessory refers to an intermediate accessory that has optical information of the other intermediate accessories.

In addition, in the following exemplary embodiments, a first unit refers to a unit that holds optical information of all of the accessories.

It should be noted that, in the following exemplary embodiments, attention is focused on whether each of the units has the optical information of the other unit, but this is not necessarily related to a release date or a manufacturing date of the unit. For example, irrespective of the release date or the manufacturing date of the unit, the optical information stored by each of the units may be changed by firmware update or the like.

First Exemplary Embodiment

Figure 1A:
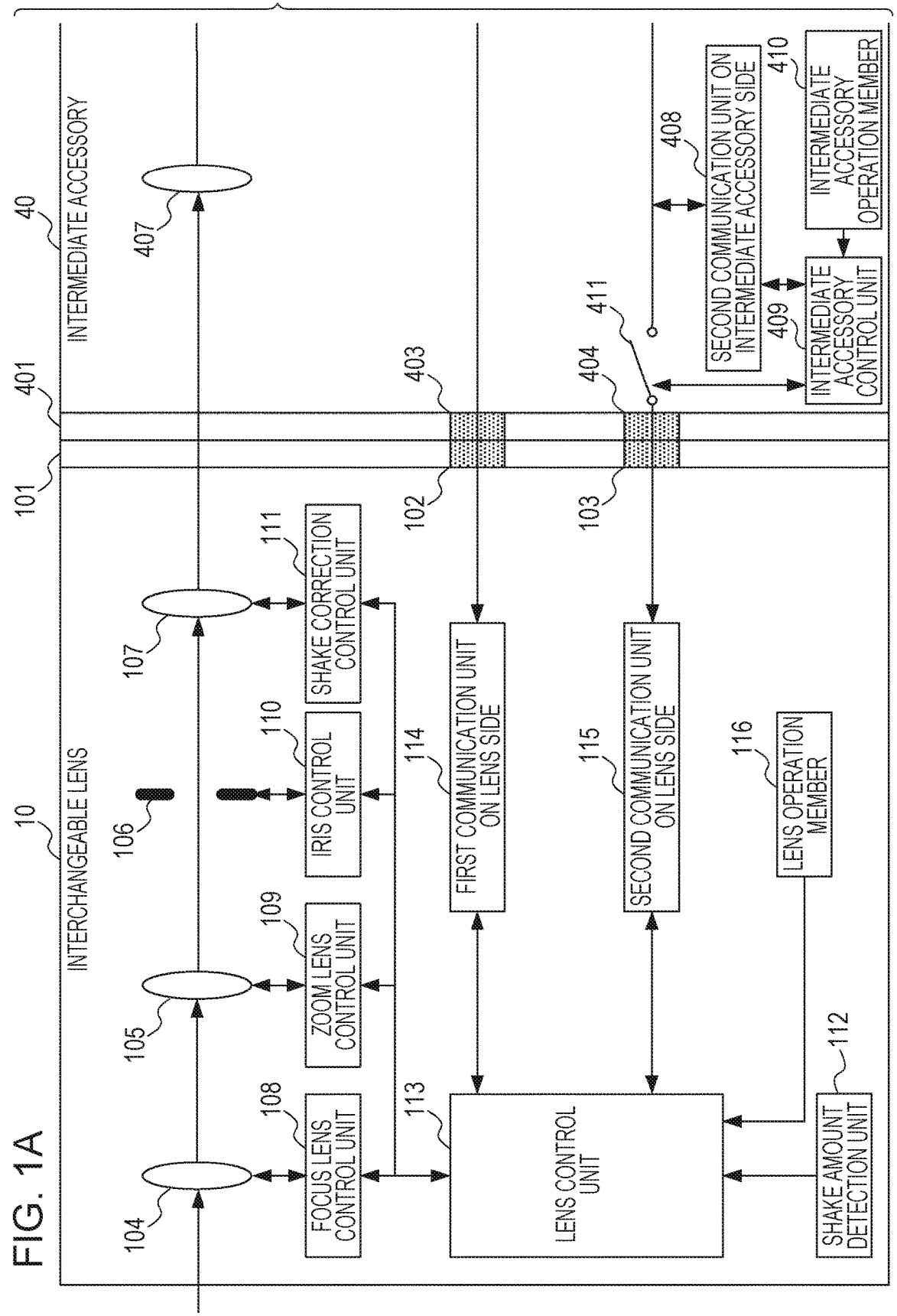
FIGS. 1A and 1B are block diagrams for describing a configuration of a camera system according to a first exemplary embodiment.
Figure 1B:
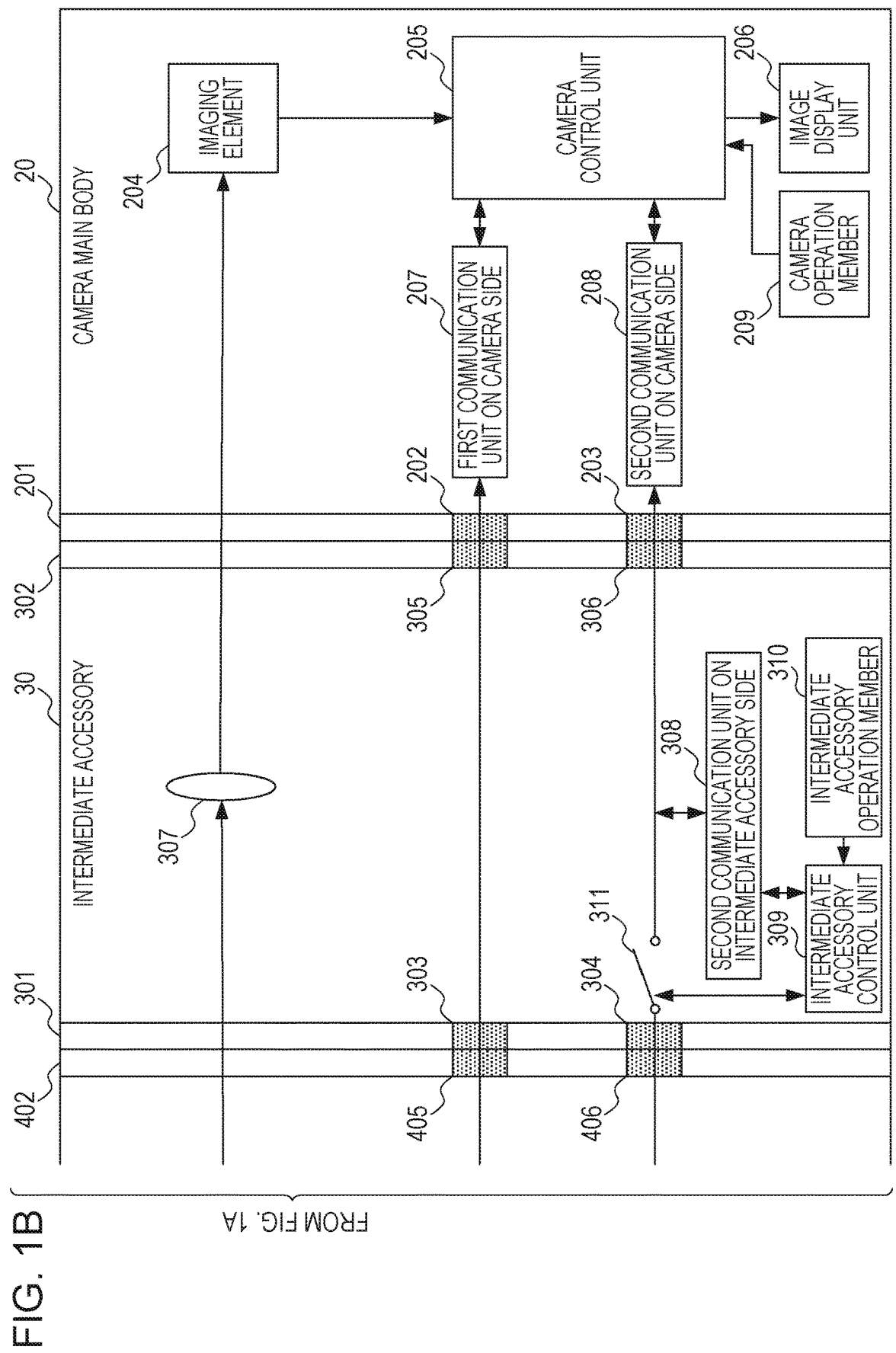

Hereinafter, a first exemplary embodiment will be described.
Camera System Configuration (FIGS. 1A and 1B)

A configuration of a camera system according to the present exemplary embodiment will be described with reference to FIGS. 1A and 1B.

The camera system includes a first communication path serving as a communication path for transmission of a control instruction from a camera main body 20 to an interchangeable lens 10, and transmission of operation information and optical information from the interchangeable lens 10 to the camera main body 20. The camera system also includes a second communication path serving as a communication path for transmission of operation information and optical information between the camera main body 20 and a plurality of intermediate accessories 30 and 40. Hereinafter, a communication performed in the first communication path will also be referred to as a first communication, and a communication performed in the second communication path will also be referred to as a second communication. It should be noted that the provision of two intermediate accessories is an example. None, one or more than two intermediate accessories may be provided.

Herein, the first communication path refers to a path where a communication is mutually performed between a first communication unit 207 on a camera side and a first communication unit 114 on a lens side via mounts 202 and 305, mounts 303 and 405, and mounts 403 and 102 which will be described below. It should be noted that the first communication unit 207 on the camera side and the first communication unit 114 on the lens side are, respectively, examples of a communication control unit.

The communication performed as described above between a certain unit and a single unit different from the above-described unit will also be referred to as a one-to-one communication according to the present exemplary embodiment.

In addition, herein, the second communication path refers to a path where a communication is performed by a communication unit 208 on the camera side with the communication units of the respective accessories. At this time, the communication is performed from the communication unit 208 on the camera side via mounts 203 and 306 and also executed via at least part of mounts 304 and 406 and mounts 404 and 103. The communication unit 208 on the camera side performs the communication with a second communication unit 115 on the lens side and second communication units 308 and 408 on the intermediate accessory side in the second communication path, for example. It should be noted that the communication unit 208 on the camera side, the second communication unit 115 on the lens side, the second communication unit 308 on the intermediate accessory side, and the second communication unit 408 on the intermediate accessory side are, respectively, examples of the communication control unit.

The communication performed between a certain unit and a plurality of units different from the above-described unit in this manner is also referred to as a one-to-multi communication according to the present exemplary embodiment.

In FIGS. 1A and 1B, the interchangeable lens 10 controls a movable optical member related to shooting (imaging). The camera main body 20 is a camera main body that shoots an image (still and/or video). The intermediate accessory 30 and the intermediate accessory 40 are an intermediate accessory such as an extender attached between the interchangeable lens 10 and the camera main body 20.

Mounts 101 and 401, mounts 402 and 301, and mounts 302 and 201 are respectively detachably attachable to the interchangeable lens 10, the intermediate accessory 40, the intermediate accessory 30, and the camera main body 20. Herein, the mount 101 is included in the interchangeable lens 10, the mount 401 and the mount 402 are included in the intermediate accessory 40, the mount 301 and the mount 302 are included in the intermediate accessory 30, and the mount 201 is included in the camera main body 20.

First communication contact point groups 102, 403, 405, 303, 305, and 202 functioning as contact point groups having one or more contact points for performing the first communication are respectively included in the mounts 101, 401, 402, 301, 302, and 201. Herein, the first communication contact point groups 102, 403, 405, 303, 305, and 202 have a configuration of being conductive when the interchangeable lens 10, the intermediate accessory 30, the intermediate accessory 40, and the camera main body 20 are connected thereto. According to the first exemplary embodiment, the first communication is also used for the camera main body 20 to control the optical member of the interchangeable lens 10.

Furthermore, second communication contact point groups 103, 404, 406, 304, 306, and 203 functioning as contact point groups having one or more contact points for performing the second communication are respectively included in the mounts 101, 401, 402, 301, 302, and 201. Herein, the second communication contact point groups 103, 404, 406, 304, 306, and 203 have a configuration of being conductive when the interchangeable lens 10, the intermediate accessory 30, the intermediate accessory 40, and the camera main body 20 are connected thereto. According to the first exemplary embodiment, the second communication is configured such that the camera main body 20 can perform the one-to-multi communication with respect to the intermediate accessory 30, the intermediate accessory 40, and the interchangeable lens 10.

In this manner, the first communication path and the second communication path which are different from each other are provided so as to respectively correspond to the first communication where the one-to-one communication is performed between the camera main body 20 and the interchangeable lens 10, and the second communication where the one-to-multi communication is performed between the camera main body and the plurality of accessories. With this configuration, as compared with a case where the communication is performed by using the same communication path, for example, an interchangeable lens control instruction can be transmitted to the interchangeable lens at a more appropriately intended timing in the first communication. Since the interchangeable lens control instruction can be immediately transmitted at the intended timing by the camera main body to the interchangeable lens, it is possible to control the plurality of optical members implemented in the interchangeable lens at a high speed and a high accuracy.

A focus lens 104 is configured to change a focus state of a shooting image. A zoom lens 105 is configured to perform zooming of the shooting image. An iris 106 is configured to perform a light amount correction of the shooting image. A shake correction lens 107 is a lens configured to correct an image blur of an image of an object occurred by shake of the camera main body or the lens.

A focus lens control unit 108 performs position detection and drive control of the focus lens 104. A zoom lens control unit 109 performs position detection and drive control of the zoom lens 105. An iris control unit 110 performs position detection and drive control of the iris 106. A shake correction control unit 111 is a shake correction control unit configured to perform position detection and drive control of the shake correction lens 107. The focus lens control unit 108, the zoom lens control unit 109, the iris control unit 110, and the shake correction control unit 111 are respectively constituted, for example, by a position sensor such as an absolute value encoder and an ultrasonic wave motor and a driving motor such as a stepping motor. A shake amount detection unit 112 is configured to detect a shake amount of the interchangeable lens 10 and is constituted, for example, by a gyro sensor.

A lens control unit 113 is configured to control the lens and includes a memory which is not illustrated in the drawing. The lens control unit 113 is an example of a communication control unit. The first communication unit 114 on the lens side is configured to perform the first communication in the interchangeable lens 10. The second communication unit 115 on the lens side is configured to perform the second communication in the interchangeable lens 10. The lens control unit 113, the first communication unit 114 on the lens side, and the second communication unit 115 on the lens side are constituted, for example, by using a CPU in the interchangeable lens 10. A lens operation member 116 is an operation member included in the interchangeable lens 10 and is, for example, a switch or an electronic ring.

An imaging element 204 of the camera main body 20 is an imaging element configured to shoot an image and is, for example, a complementary metal-oxide semiconductor (CMOS) image sensor.

A camera control unit 205 is configured to control the camera main body and includes a memory which is not illustrated in the drawing. The camera control unit 205 is an example of the communication control unit. The first communication unit 207 on the camera side is configured to perform the first communication in the camera main body 20. The communication unit 208 on the camera side is configured to perform the second communication in the camera main body 20. The camera control unit 205, the first communication unit 207 on the camera side, and the communication unit 208 on the camera side is constituted, for example, by using the CPU in the camera main body 20.

An image display unit 206 is configured to display the image shot by the camera main body 20 and is, for example, a liquid crystal monitor. A camera operation member 209 is configured to set a shooting condition and is, for example, a dial ring or a switch.

For example, intermediate accessory optical members 307 and 407 according to the present exemplary embodiment are optical members that provide change in optical characteristics with respect to the shooting image. The intermediate accessory optical members 307 and 407 are, for example, a magnification varying lens or an ND filter.

The second communication units 308 and 408 on the intermediate accessory side are communication units configured to perform the second communication in the intermediate accessory 30 and the intermediate accessory 40. Intermediate accessory control units 309 and 409 are configured to respectively control the intermediate accessory 30 and the intermediate accessory 40 and include a memory which is not illustrated in the drawing. Each of the intermediate accessory control units 309 and 409 is an example of the communication control unit. The intermediate accessory control units 309 and 409 according to the present exemplary embodiment are respectively included in the CPU of the intermediate accessory 30 and the CPU of the intermediate accessory 40, for example.

Intermediate accessory operation members 310 and 410 are respectively operation members included in the intermediate accessory 30 and the intermediate accessory 40. For example, the intermediate accessory operation members 310 and 410 are a switch or an electronic ring.

A second communication connection switch 311 and a second communication connection switch 411 are respectively switches which are on second communication lines of the intermediate accessory 30 and the intermediate accessory 40, and are also provided on the lens side with respect to the second communication unit of the intermediate accessory side. The second communication connection switch 311 and the second communication connection switch 411 can respectively control short-circuiting and opening by the intermediate accessory control unit 309 and the intermediate accessory control unit 409. When these switches are provided, it is possible to interrupt the second communication on the lens side with respect to itself. That is, when the short-circuiting and the opening of these switches are controlled, it is possible to change a communication state of the second communication.

According to the first exemplary embodiment, a flow for light incident on the interchangeable lens 10 to be output as an image is as follows.

The light incident on the interchangeable lens 10 passes through the focus lens 104, the zoom lens 105, the iris 106, the shake correction lens 107, and the intermediate accessory optical members 407 and 307 to be imaged on the imaging element 204 and converted into an electric signal. The electric signal from the imaging element 204 is changed by the camera control unit 205 into an image signal to be output to the image display unit 206.

Figure 2A:
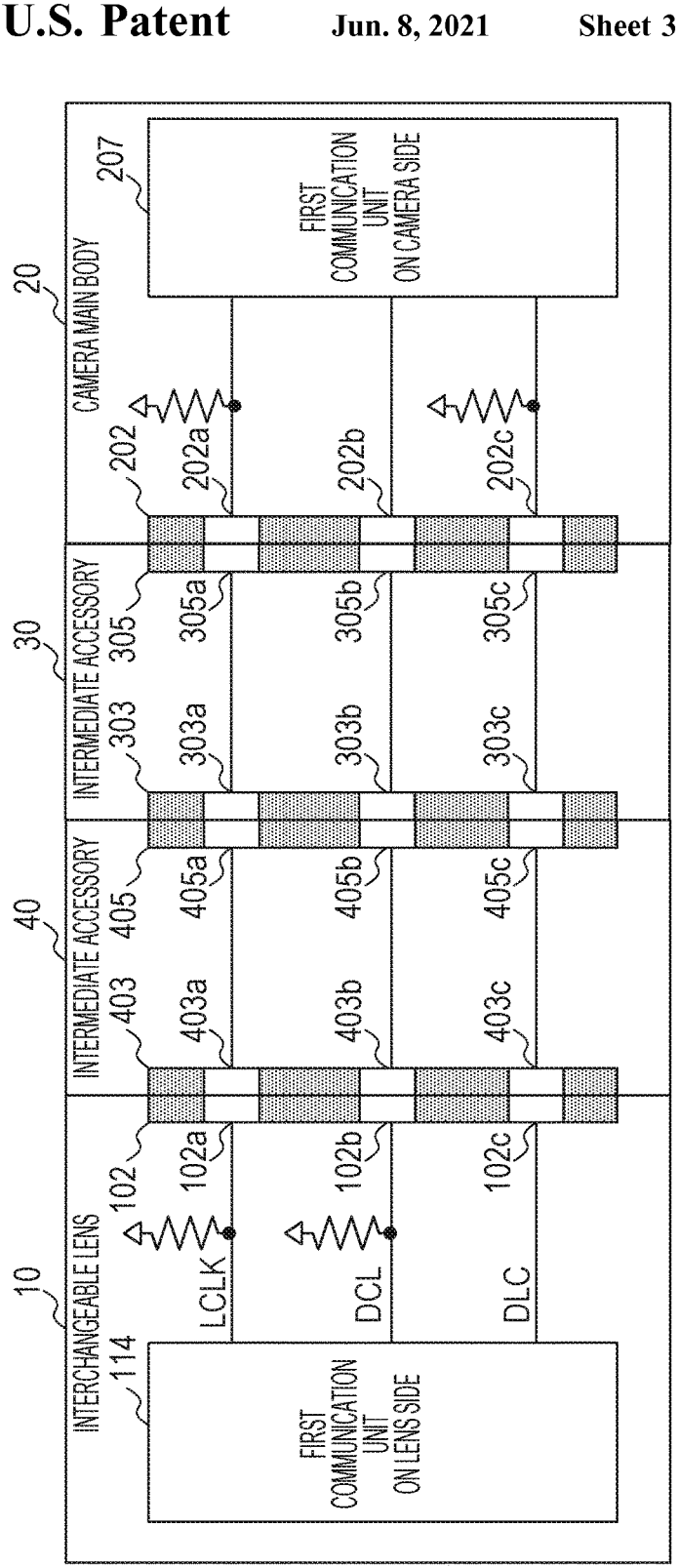
FIGS. 2A and 2B are explanatory diagrams for describing a first communication according to the first exemplary embodiment.
Figure 2B:
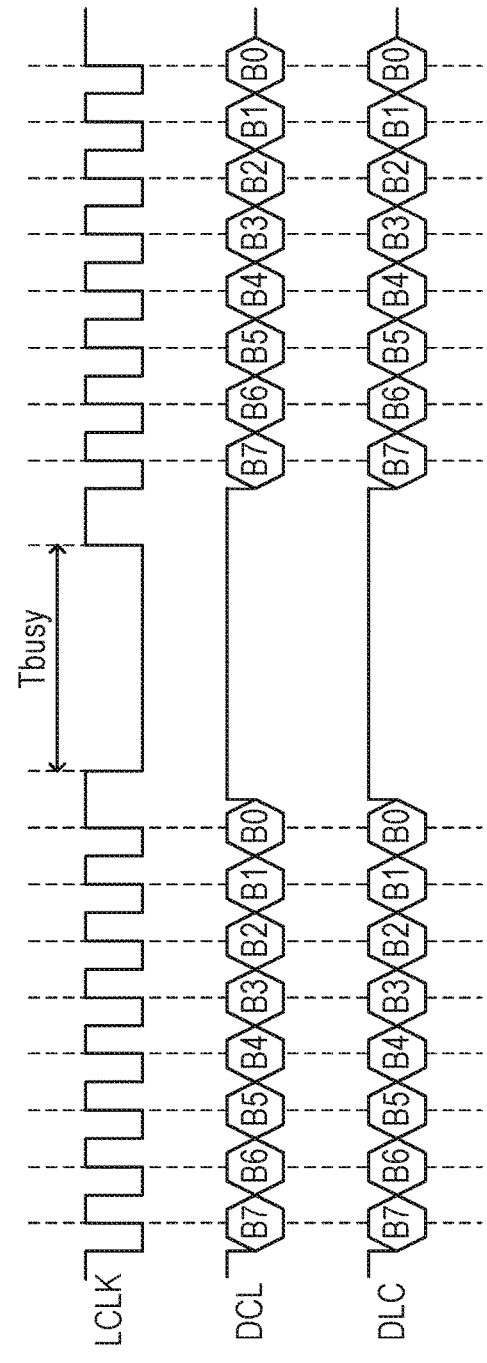

First Communication (FIGS. 2A and 2B)

Next, the first communication will be described with reference to FIGS. 2A and 2B. It should be noted that a case where a clock synchronous communication is performed is exemplified as the first communication according to the present exemplary embodiment, but an asynchronous communication may also be performed.

FIG. 2A illustrates a configuration in which the first communication is performed. First communication LCLK terminals 102a, 403a, 405a, 303a, 305a, and 202a functioning as terminals of a clock line LCLK output from the first communication unit 207 on the camera side which is configured to perform the clock synchronous communication are respectively included in the first communication contact point groups 102, 403, 405, 303, 305, and 202. In addition, similarly, first communication DCL terminals 102b, 403b, 405b, 303b, 305b, and 202b functioning as terminals of a data line DCL output from the first communication unit 207 on the camera side of the clock synchronous communication are included. It should be noted that each of the first communication DCL terminals 102b, 403b, 405b, 303b, 305b, and 202b is an example of a first communication terminal. Furthermore, similarly, first communication DLC terminals 102c, 403c, 405c, 303c, 305c, and 202c functioning as terminals of a data line DLC output from the first communication unit 114 on the lens side of the clock synchronous communication are included. It should be noted that each of the first communication DLC terminals 102c, 403c, 405c, 303c, 305c, and 202c is an example of a third communication terminal.

As illustrated in FIG. 2A, the clock line LCLK and the data line DCL are pull-up connected to an electric potential in the interchangeable lens 10. In addition, the clock line LCLK and the data line DLC are pull-up connected to an electric potential in the camera main body 20.

The clock line LCLK, the data line DCL, and the data line DLC in the intermediate accessory 30 and the intermediate accessory 40 are respectively short-circuited between the first communication contact point groups 403 and 405, and the first communication contact point groups 303 and 305. In other words, signals communicated via the clock line LCLK, the data line DCL, and the data line DLC pass through the intermediate accessory 30 and the intermediate accessory 40.

FIG. 2B illustrates waveforms of the clock line LCLK, the data line DCL, and the data line DLC when the first communication is performed. The first communication unit 207 on the camera side outputs a clock to the clock line LCLK and also outputs 8-bit data of B7 to B0 to the data line DCL in synchronism with rising signals of the clock line LCLK. Similarly, the first communication unit 114 on the lens side outputs 8-bit data of B7 to B0 to the data line DLC in synchronism with the rising signals of the clock line LCLK. Furthermore, the first communication unit 207 on the camera side receives the 8-bit data of B7 to B0 of the data line DLC in synchronism with the rising signals of the clock line LCLK. Similarly, the first communication unit 114 on the lens side receives the 8-bit data of B7 to B0 of the data line DCL in synchronism with the rising signals of the clock line LCLK. With the above-described processing, the first communication unit 207 on the camera side and the first communication unit 114 on the lens side can mutually exchange the communication data. When the first communication unit 114 on the lens side receives the 8-bit data of B7 to B0 of the data line DCL, the first communication unit 114 performs LOW output of the clock line LCLK for a Tbusy time and thereafter cancels the LOW output. Herein, the Tbusy time is a time when the interchangeable lens 10 processes the received data. A configuration is adopted in which, after the data transmission, the first communication unit 207 on the camera side does not perform the data transmission until the clock line LCLK changes from LOW to HIGH. With the signal control, it is possible to perform a flow control of the first communication. When the above-described processing is repeated, it is possible to transmit the data between the first communication unit 207 on the camera side and the first communication unit 114 on the lens side by the first communication.

Herein, the second communication can be realized by the same communication method as the first communication, a bi-directional asynchronous communication method, a master/slave method, a token passing method, or the like.

Figure 12:
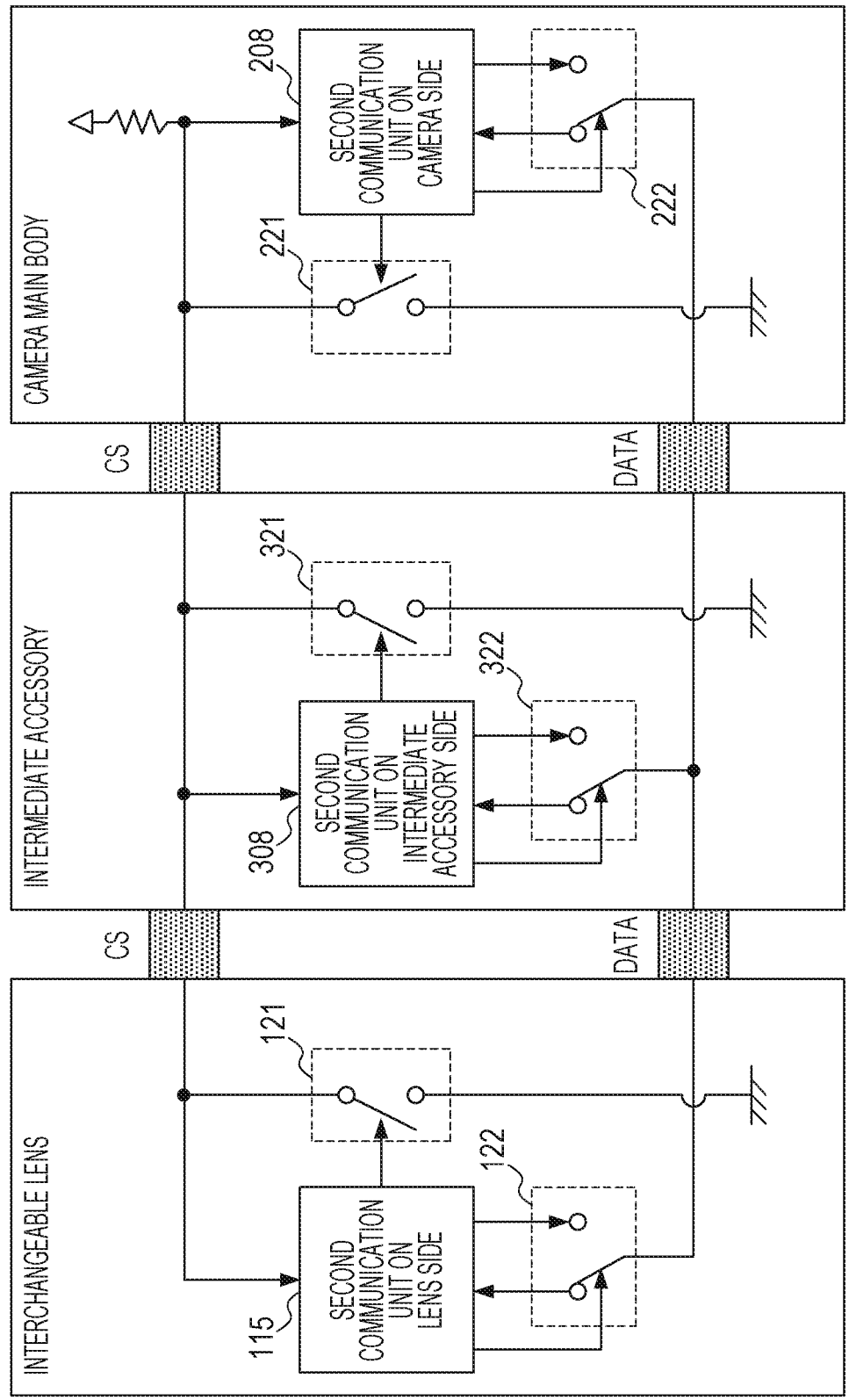
FIG. 12 is an explanatory diagram for describing a second communication according to the first exemplary embodiment.

Second Communication (FIG. 12)

Next, a configuration of the communication path of the second communication corresponding to the "one-to-multi" communication established among the camera main body 20, the interchangeable lens 10, and the intermediate accessory 30 will be described with reference to a configuration diagram of FIG. 12. The operation is also performed similarly as in the present descriptions in a case where the intermediate accessory 40 is inserted. It should be noted that a communication circuit is not limited to this as long as the "one-to-multi" communication can be performed. Furthermore, in a case where a plurality of communication circuits are provided, with regard to another communication circuit, the "one-to-one" communication such as a serial communication of a clock synchronous method or a UART communication may also be performed.

The second communication unit 208 on the camera side, the second communication unit 115 on the lens side, and the second communication unit 308 on the intermediate accessory side are connected to one another via contact portions similarly as in the first communication. According to the present exemplary embodiment, the communication is performed by using a connected CS signal line and a DATA signal line.

A camera communication circuit is constituted by a ground switch 221 and an input and output switching switch 222. A lens communication circuit is constituted by a ground switch 121 and an input and output switching switch 122. An intermediate accessory communication circuit is constituted by a ground switch 321 and an input and output switching switch 322.

The signal line is constituted by two lines including a CS signal line (first signal line) for conveying a signal for performing a flow control of the communication and controlling a communication timing of the second communication, and a DATA signal line (second signal line) for conveying data to be transmitted and received.

The CS signal line is connected to the communication unit 208 on the camera side, the second communication unit 308 on the intermediate accessory side, and the communication unit 115 on the lens side and has a configuration in which a state of the signal line (Hi/Low) can be detected. The CS signal line has a pull-up connection to a power source which is not illustrated in the drawing in the camera main body, and also has a configuration in which it is possible to connect to GND via the ground switch 121 of the interchangeable lens 10, the ground switch 221 of the camera main body 20, and the ground switch 321 of the intermediate accessory 30 (open drain connection). With this configuration, it is possible to set the state of the CS signal line as Low when the interchangeable lens 10, the camera main body 20, and the intermediate accessory 30 respectively turns on the ground switches (connection). On the other hand, it is possible to set the state of the CS signal line as Hi when all of the interchangeable lens 10, the camera main body 20, and the intermediate accessory 30 turn off the respective connection switches (interruption). The CS signal line is used to distinguish a broadcast communication from a peer-to-peer (P2P) communication or switch a communication direction in the P2P communication, for example.

The DATA signal line is a single-track bidirectional data transmission line that can be used while a conveyance direction of the data is switched. The DATA signal line has a configuration in which the DATA signal line can be respectively connected to the communication unit 115 on the lens side via the input and output switching switch 122 of the interchangeable lens 10, connected to the communication unit 208 on the camera side via the input and output switching switch 222 of the camera main body 20, and connected to the second communication unit 308 on the intermediate accessory side via the input and output switching switch 322 of the intermediate accessory 30. Each microcontroller is provided with a data output unit configured to transmit the data (CMOS method) and a data input unit configured to receive the data (CMOS method), and it is possible to select whether the DATA signal line is connected to the data output unit or connected to the data input unit by operating the input and output switching switch. With this configuration, in a case where the interchangeable lens 10, the camera main body 20, or the intermediate accessory 30 transmits the data by itself, the data transmission can be performed when the interchangeable lens 10, the camera main body 20, or the intermediate accessory 30 each operates the input and output switching switch so as to connect the DATA signal line to the data output unit. On the other hand, the interchangeable lens 10, the camera main body 20, or the intermediate accessory 30 receives the data by itself, the data reception can be performed when the interchangeable lens 10, the camera main body 20, or the intermediate accessory 30 each operates the input and output switching switch so as to connect the DATA signal line to the data input unit.

Here, the broadcast communication and the P2P communication performed by a CS signal and a data signal will be described.

Since the CS signal line drops to LOW when any one of the units is connected to GND, the CS signal line is used as a trigger of the broadcast communication.

The broadcast communication is started when the camera main body acting as a main subject of the communication causes the CS signal line to be LOW. It is determined that data received by the accessory by the DATA line when the CS signal line is LOW is broadcasted data.

In addition, it is possible to request the camera main body for the broadcast communication when each accessory causes the CS signal line to be LOW.

While the unit that has detected the LOW state of the CS signal line turns on its own ground switch during the process of broadcasting, it is possible to notify the other unit that the process with respect to the broadcast communication continues. While it is regulated that the second communication starts by the broadcast communication and ends by the broadcast communication, the DATA signal line of the accessory may basically maintain the reception state. In a case where the camera performs the P2P communication with the accessory, the accessory of a communication target is first specified by the broadcast communication. The camera that has completed the transmission of the broadcast communication and the specified accessory perform the P2P communication.

In the P2P communication, the camera first transmits data, and the accessory that has received the data transmits data to the camera. This process is alternately performed thereinafter. In the P2P communication, the CS signal during the communication maintains HIGH to be distinguished from the broadcast communication. The CS signal in the P2P communication is used as a busy signal. That is, LOW is set for the camera and the accessory to notify that the data transmission is ended from itself to the partner, and HIGH is set to notify that the preparation of the data reception is completed.

When the P2P communication is ended, the camera performs the broadcast communication with regard to the end of the P2P communication.

With this configuration, the camera can perform the data communication via the two communication lines with a plurality of accessories.

It should be noted that FIG. 12 illustrates an example of the communication circuit according to the embodiment of the present invention, but the present invention is not limited to this. For example, a configuration may be adopted in which the CS signal line is subjected to pull-down connection to GND in the camera main body 20, and also a connection can be established to a power source which is not illustrated in the drawing via the ground switch 121 of the interchangeable lens 10, the ground switch 221 of the camera main body 20, and the ground switch 321 of the intermediate accessory 30. In addition, a configuration may be adopted in which the DATA signal line is regularly connected to each of the data input units, and connection/interruption between the DATA signal line and each of the data output units can be operated by a switch.
Corrected Optical Information Obtaining Processing (FIG. 3)

Next, a flow for the camera main body 20 to obtain the optical information of the interchangeable lens 10 which is corrected on the basis of the optical information of the intermediate accessory 30 and the intermediate accessory 40 will be described with reference to FIG. 3. It should be noted that the optical information of the intermediate accessory is, for example, a magnification that changes depending on insertion of the intermediate accessory in a case where the intermediate accessory includes the magnification varying lens. In addition, the optical information of the interchangeable lens 10 is, for example, information such as a focal length, an aperture, a focus sensitivity, or a focus correction amount.

Figure 3:
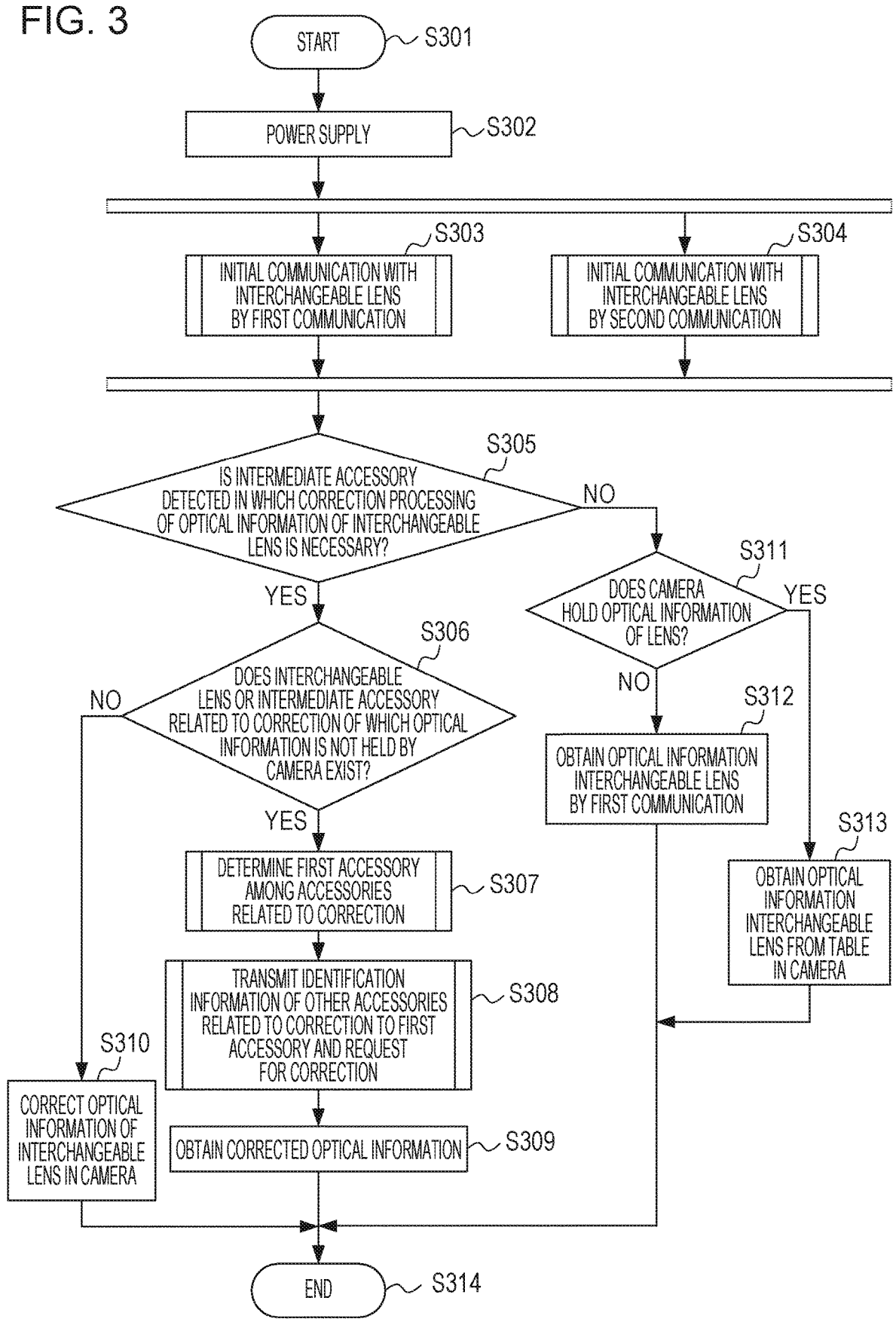
FIG. 3 is a flow chart illustrating a flow of processing for obtaining corrected optical information according to the first exemplary embodiment.

FIG. 3 illustrates a flow of processing for the camera main body 20 to obtain the optical information of the interchangeable lens 10, which is corrected on the basis of the optical information of the intermediate accessory 30 and the intermediate accessory 40 after power is supplied for the first time since the intermediate accessory and the interchangeable lens are attached.

In S301, the camera main body 20 is activated, and the flow shifts to S302.

When the flow shifts to S302, the camera main body 20 supplies power to the interchangeable lens 10, the intermediate accessory 30, and the intermediate accessory 40 via mount contact points for power supply which are not illustrated in the drawings, and the flow shifts to S303 and S304.

When the flow shifts to S303, the camera control unit 205 performs the initial communication with the interchangeable lens 10 in the first communication. In the initial communication, identification information of the interchangeable lens 10 is obtained. The interchangeable lens identification information may be information such as a model number (ID) used for identifying a type (model) of the interchangeable lens or optical data identification information indicating the optical data intrinsic to the interchangeable lens. The interchangeable lens identification information may also include information indicating a function that the interchangeable lens has or information such as a manufacturing number (serial number) with which it is possible to identify an individual piece among the same model.

A flow of sub-process S303 for obtaining identification information of the interchangeable lens 10 in the first communication will be described below with reference to FIG. 4. When the flow shifts to S304, the camera control unit 205 performs the initial communication with the accessory in the second communication and obtains accessory authentication information.

Herein, the accessory authentication information includes the identification information of the accessory and the correction processing necessity/unnecessity information.

Intermediate accessory identification information may be information such as a model number (ID) used for identifying a type (model) of the intermediate accessory or optical data identification information indicating the optical data intrinsic to the intermediate accessory. The intermediate accessory identification information may also include information indicating a function that the intermediate accessory has or information such as a manufacturing number (serial number) with which it is possible to identify an individual piece among the same model.

The correction processing necessity/unnecessity information is information indicating whether or not the correction of the optical information of the interchangeable lens 10 becomes necessary after the attachment of the accessory. In a case where the accessory is the intermediate accessory and does not affect the optical system of the interchangeable lens 10, the correction processing is unnecessary. When the camera control unit 205 understands in advance that the correction processing due to the attachment of the intermediate accessory is unnecessary on the basis of the correction processing necessity/unnecessity information of the intermediate accessory, the camera can ignore the intermediate accessory in the obtaining processing of the optical information of the interchangeable lens 10.

The intermediate accessory in which the correction processing is unnecessary includes, for example, an intermediate accessory provided with an optical member optically designed so as to cancel an influence onto the optical system causes by its own width and attached for a purpose of installing an extra operation member. The intermediate accessory also includes a mount converter to be attached between the interchangeable lens of the mount having a short flange focus and the camera main body to change to have a flange focus length appropriate to the camera main body, and the like.

A flow of sub-process in S304 for obtaining authentication information of the intermediate accessory in the second communication will be described below with reference to FIG. 5. The processes in S303 and S304 may be performed in parallel or may also be sequentially performed since the different communication paths are used.

When the identification information of the interchangeable lens and the authentication information of the attached accessory are obtained in S303 and S304, the flow shifts to S305.

When the flow shifts to S305, the camera control unit 205 determines whether or not the intermediate accessory in which the correction processing of the optical information of the interchangeable lens is necessary exists on the basis of the correction processing necessity/unnecessity information obtained in S304. In a case where the intermediate accessory in which the correction processing necessity/unnecessity information is "necessary" (will be also referred to as an intermediate accessory related to the correction) is attached, the flow shifts to S306.

When the flow shifts to S306, the camera control unit 205 determines whether or not the accessory of which optical information is not held by the camera control unit 205 exists among the interchangeable lens and the intermediate accessories in which the correction processing necessity/unnecessity information is "necessary" in S305 (these will be also referred to as accessories related to the correction). In a case where the camera control unit 205 determines that the accessory of which optical information is not held by the camera control unit 205 exists among the accessories related to the correction, the correction processing of the optical information of the interchangeable lens is not performed in the camera control unit 205. In this case, to search for a request destination of the correction processing, the flow shifts to S307.

When the flow shifts to S307, the camera control unit 205 determines an accessory that holds the optical information of all the other accessories (will be also referred to as a first accessory) among the accessories related to the correction. In other words, the term "first accessory" below means an accessory that holds the optical information of all the other accessories. As a method of determining the first accessory, for example, the determination may be performed on the basis of the identification information obtained from the accessory, or an enquiry is made to the accessory by the communication. A detail thereof will be described below with reference to FIG. 6.

When the first accessory is confirmed in S307, the flow shifts to S308.

When the flow shifts to S308, the camera control unit 205 transmits the identification information of the accessory related to the other correction to the first accessory confirmed in S307 and also requests for the correction processing of the optical information of the interchangeable lens 10. According to the present exemplary embodiment, in a case where the first accessory is the interchangeable lens, for example, the communication is performed by the first communication. In a case where the first accessory is the intermediate accessory, the communication is performed by the second communication.

A control unit of the first accessory which has received the correction request in S308 performs the correction processing of the optical information of the interchangeable lens 10 by using the held optical information of the other accessories related to the correction.

When the flow shifts to S309, the camera control unit 205 obtains the corrected optical information by the first accessory.

On the other hand, in S306, when the camera control unit 205 determines that the accessory of which optical information is not held by the camera control unit 205 does not exist among the interchangeable lens and the intermediate accessories in which the correction processing necessity/unnecessity information is "necessary" in S305, the flow shifts to S310. In this case, the camera control unit 205 holds the optical information of all the accessories.

When the flow shifts to S310, the camera control unit 205 performs the correction of the optical information of the interchangeable lens by using the optical information of the interchangeable lens and the optical information of the intermediate accessory which are held by the camera control unit 205 itself.

On the other hand, in S305, in a case where the camera control unit 205 determines that the intermediate accessory in which the correction processing of the optical information of the interchangeable lens is necessary does not exist, the intermediate accessory is not attached, or the correction processing necessity/unnecessity information of all the attached intermediate accessories is "unnecessary", the flow shifts to S311. In S311, the processing in a case where the correction of the optical information of the interchangeable lens is not necessary is performed.

When the flow shifts to S311, the camera main body 20 determines whether or not the optical information of the interchangeable lens 10 is held on the basis of the interchangeable lens identification information obtained in S303. In a case where the camera control unit 205 does not hold the optical information of the interchangeable lens, the flow shifts to S312.

When the flow shifts to S312, the camera control unit 205 obtains the optical information of the interchangeable lens 10 from the lens control unit 113 by the first communication.

On the other hand, in S311, in a case where it is determined that the optical information of the interchangeable lens 10 is held, the camera control unit 205 obtains the optical information from a data table in the camera in S313.

After the optical information is obtained in S309, S310, S312, or S313, the flow shifts to S314, and the optical information obtaining sequence is ended.

After the optical information is obtained, the first communication path is used for the communication for the camera main body 20 to control the interchangeable lens 10, and the second communication path is used for the communication for the camera main body 20 to regularly obtain the operation information of the intermediate accessory operation member 310 and the intermediate accessory operation member 410. Either the first communication path or the second communication path may be used as the communication for regularly obtaining the operation information of the lens operation member 116 of the interchangeable lens by taking occupancies of the respective communication paths and immediacy used for the communication and the control into account.

Figure 4:
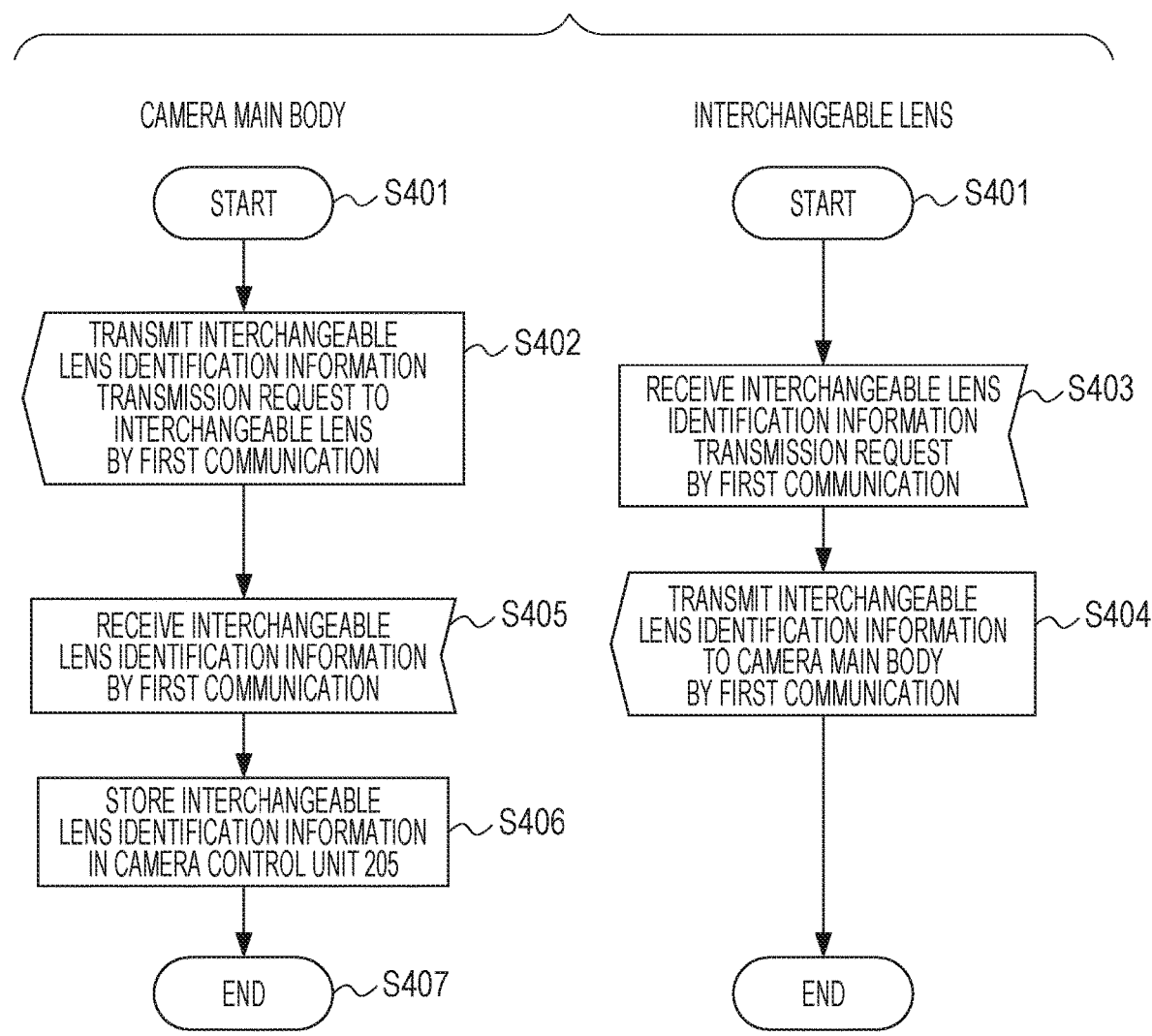
FIG. 4 is a flow chart illustrating initial communication processing of a camera and a lens according to the first exemplary embodiment.

Initial Communication Processing of the Camera and the Interchangeable Lens (FIG. 4)

FIG. 4 illustrates a flow of the sub-process S303 corresponding to the initial communication performed by the camera main body 20 with the interchangeable lens 10 in the camera system according to the first exemplary embodiment. In the initial communication, the camera control unit 205 obtains the identification information of the interchangeable lens 10 from the lens control unit 113.

In S401, the sub-process is started, and the flow shifts to S402.

When the flow shifts to S402, the camera control unit 205 transmits an interchangeable lens identification information transmission request to the lens control unit 113 by the first communication.

In S403, when the lens control unit 113 receives the interchangeable lens identification information transmission request, the flow shifts to S404. Then, the lens control unit 113 transmits the interchangeable lens identification information to the camera control unit 205 by the first communication.

In S405, the camera control unit 205 receives the interchangeable lens identification information, and the flow shifts to S406 where the received interchangeable lens identification information is stored.

The sub-process S303 ends in S407.

Figure 5:
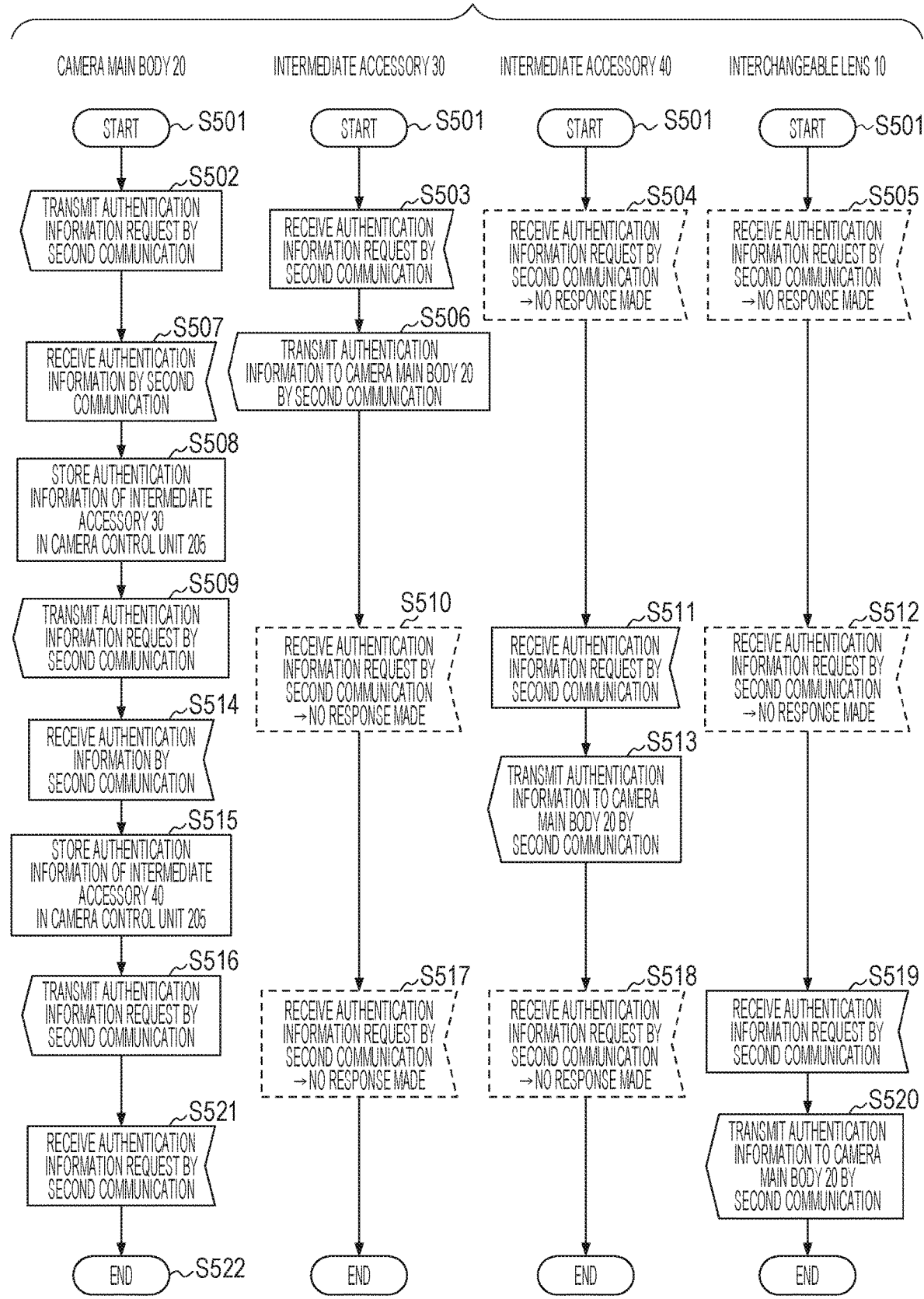
FIG. 5 is a flow chart illustrating initial communication processing of the camera and an accessory according to the first exemplary embodiment.

Initial Communication Processing of the Camera and the Intermediate Accessory (FIG. 5)

FIG. 5 is an explanatory diagram for describing a flow of the sub-process S304 corresponding to the initial communication processing performed by the camera main body 20 and the accessory in the camera system according to the first exemplary embodiment. In the initial communication, the camera control unit 205 obtains the accessory authentication information. The authentication information will be described below.

In S501, when the sub-process is started, the flow shifts to S502.

When the flow shifts to S502, the camera control unit 205 transmits an authentication information request to the intermediate accessory control unit 309 by the second communication.

Herein, the authentication information request according to the present exemplary embodiment will be described with reference to FIG. 10C. The authentication information request according to the present exemplary embodiment is information transmitted to the accessory from the camera control unit 205 to request transmission of three pieces of information corresponding to the authentication information. The authentication information request includes an accessory identification information request, a correction processing necessity/unnecessity information request, and a termination information request.

In S503, when the intermediate accessory control unit 309 receives the authentication information request, the flow shifts to S506.

In S506, the intermediate accessory control unit 309 transmits the authentication information of the intermediate accessory 30 to the camera control unit 205 by the second communication.

Herein, the authentication information transmitted by the intermediate accessory to the camera control unit 205 will be described with reference to FIG. 10D. The authentication information includes the identification information, the correction processing necessity/unnecessity information, and the termination information.

The correction processing necessity/unnecessity information is information indicating "necessary" when the intermediate accessory is to change the optical characteristics. When the intermediate accessory is not to change the optical characteristics, the correction processing necessity/unnecessity information is information indicating "unnecessary".

According to the present exemplary embodiment, termination information refers to information indicating whether or not the accessory is a termination of the second communication as viewed from the camera main body 20. When an intermediate adapter is the termination of the second communication as viewed from the camera main body 20, the termination information is information indicating that "here is the termination". When the accessory is not the termination of the second communication as viewed from the camera main body 20, the termination information is information indicating that "here is not the termination".

In the one-to-multi communication as in the second communication, for example, it is possible to specify the transmission destination by adding the identification information of the accessory to the beginning of the communication data or the like. However, since the camera control unit 205 does not have any information of the accessory in the stage of S502, the specification of the transmission destination by the communication data is not performed.

In view of the above, an example of a method for the camera main body 20 to sequentially communicate with the plurality of accessories in the present sub-process includes a method of using the second communication connection switch 311 and the second communication connection switch 411 as will be described below. It is assumed that the second communication connection switch 311 and the second communication connection switch 411 are short-circuited (closed) in a static state.

In S501, the camera control unit 205 transmits present sub-process start information by the second communication. Since the second communication connection switch 311 and the second communication connection switch 411 are short-circuited (closed), the respective accessories receive the present sub-process start information. The respective intermediate accessories that have received the present sub-process start information release their own second communication connection switches. With this configuration, a state is established in which only the intermediate accessory control unit 309 is connected to the camera control unit 205, and it is possible to receive the data transmitted by the camera control unit 205. When the intermediate accessory control unit 309 that has ended the processing with respect to the received data short-circuits (closes) the second communication connection switch 311, the intermediate accessory control unit 409 can receive the data transmitted by the camera control unit 205. The intermediate accessory 30 that has short-circuited the second communication connection switch does not respond to the transmission information of the camera control unit 205 until reception of end information of the present sub-process which is transmitted by the camera control unit 205 in S522 where the present sub-process ends.

Since the intermediate accessory 40 also takes the similar behavior, the camera control unit 205 can sequentially communicate with the plurality of accessories.

In S504 and S505, since the second communication connection switch 311 is open, the intermediate accessory 40 and the lens control unit 113 do not receive the information transmission request transmitted from the camera control unit 205 in S502.

In S506, the intermediate accessory control unit 309 transmits the authentication information of the intermediate accessory 30 to the camera control unit 205 by the second communication. Subsequently, the second communication connection switch 311 is short-circuited. With this configuration, the intermediate accessory control unit 409 can receive the data transmitted by the camera control unit 205.

In S507, the camera control unit 205 receives the authentication information of the intermediate accessory 30, and the flow shifts to S508. Subsequently, the received authentication information is stored.

As described above, the authentication information of the intermediate accessory 30 is obtained in S502 to S508, and the flow shifts to S509. In S509, S511, and S513 to S515, the camera control unit 205 obtains the authentication information of the intermediate accessory 40 similarly as in S502, S503, and S506 to S508.

In S510, the intermediate accessory control unit 309 receives the authentication information request transmitted by the camera control unit 205, but no response is made since the end information of the present sub-process is not received.

Since the second communication connection switch 411 is open in S512 similarly as in S504 and S505, the lens control unit 113 does not receive the information transmission request transmitted from the camera control unit 205 in S509.

The first exemplary embodiment relates to an example in which total three accessories including one interchangeable lens and two intermediate accessories are connected, but only one intermediate accessory may be connected, or three or more intermediate accessories may be connected. Since any number of intermediate accessories may be attached, the information obtaining processing of the accessory is preferably ended by obtaining the termination information of the accessory.

The termination information of the accessory may be obtained by another method. For example, similarly as in S502 and S509, when the camera control unit 205 transmits the authentication information request while it is assumed that the intermediate accessory is attached, it may be notified that this is the interchangeable lens on the basis of the termination information returned from the second communication unit 115. In addition, the intermediate accessory 40 may notify the camera main body 20 in S513 by detecting that the intermediate accessory 40 itself is the termination on the basis of a connection state of a terminal which is not illustrated in the drawings or the like. According to the present exemplary embodiment, a case will be described in which the notification of the termination information is performed when the lens control unit 113 responds the authentication information including the termination information to the authentication information request from the camera control unit 205.

In S516, the camera main body 20 transmits the authentication information request by the second communication similarly as in S502 and S509. In S517 and S518, the intermediate accessory 30 and the intermediate accessory 40 do not make a response since the end information of the present sub-process is not received similarly as in S510.

In S519, the lens control unit 113 receives the authentication information request, and the flow shifts to S520 where the authentication information is transmitted to the camera control unit 205 by the second communication.

Herein, the authentication information transmitted by the lens control unit 113 to the camera control unit 205 will be described with reference to FIG. 10E. The authentication information includes the identification information, the correction processing necessity/unnecessity information, and the termination information.

Since an interchangeable lens 10 is not the intermediate accessory, the correction of the optical information of the interchangeable lens 10 does not become necessary by the attachment. Therefore, the correction processing necessity/unnecessity information is information indicating that the correction processing is unnecessary.

Since the interchangeable lens 10 according to the present exemplary embodiment is the termination of the second communication as viewed from the camera main body 20, the termination information is information indicating that the interchangeable lens 10 is the termination of the second communication.

In S521, the camera control unit 205 obtains the authentication information, and the flow shifts to S522 where the series of initial communication processing ends.

It should be noted that the correction processing necessity/unnecessity information is preferably obtained to shorten the communication processing as in the present exemplary embodiment. However, in a case where the correction processing necessity/unnecessity information is not exchanged, it is determined that the correction processing is necessary in all the intermediate accessories. The sub-process S304 ends in S522.

According to the present exemplary embodiment, the processing using the method of sequentially communicating with the plurality of accessories by using the second communication connection switch has been described. It should be noted however that another method may also be used as long as it is possible to perform the communication with the plurality of accessories. For example, when a voltage level of a terminal itself to which the accessory is connected which is not illustrated in the drawings is detected, it is possible to understand to which position the accessory is attached from the camera main body side. In this case, the number of the information transmission requests transmitted from the camera is counted, and the information is transmitted to the camera main body only when the count is matched with its own attachment order.

Figure 6:
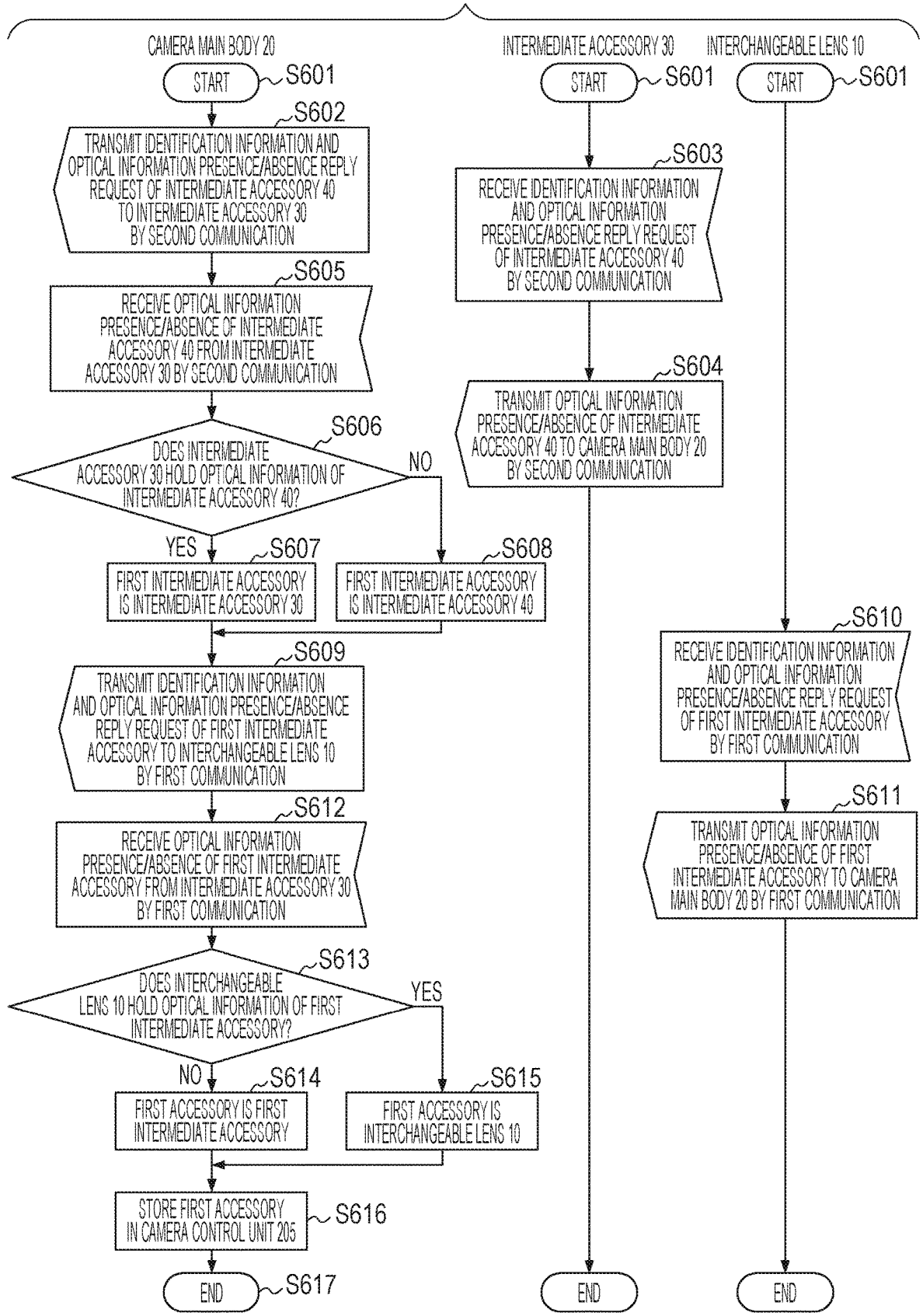
FIG. 6 is a flow chart illustrating a flow of processing for determining a first accessory according to the first exemplary embodiment.

Sub-Process S307 for Determining the First Accessory (FIG. 6)

According to the first exemplary embodiment, a flow of the sub-process S307 for the camera main body 20 to search for the first accessory among the accessories related to the correction by the communication will be described with reference to FIG. 6.

FIG. 6 illustrates a flow of the sub-process S307 for the camera control unit 205 to determine the first accessory among the accessories related to the optical correction in the camera system according to the first exemplary embodiment. Herein, the camera control unit 205 does not hold the optical information of the interchangeable lens 10, the intermediate accessory 30, and the intermediate accessory 40. In addition, both the correction processing necessity/unnecessity information of the intermediate accessory 30 and the correction processing necessity/unnecessity information of the intermediate accessory 40 are set as "necessary".

The sub-process starts in S601, and the flow shifts to S602.

When the flow shifts to S602, the camera control unit 205 transmits the identification information of the intermediate accessory 40 and a presence/absence reply request of the optical information to the intermediate accessory control unit 309 by the second communication and enquires whether or not the optical information of the intermediate accessory 40 is held. As a method of specifying the transmission destination, for example, the identification information of the intermediate accessory may be added to the beginning of the communication data in transmission data, and the accessory may refer to a value of the beginning of the communication data to determine whether or not this is the communication addressed to itself.

In S603, the intermediate accessory control unit 309 receives the identification information of the intermediate accessory 40 and the presence/absence reply request of the optical information, and the flow shifts to S604.

In S604, the intermediate accessory control unit 309 transmits information on whether or not the optical information of the intermediate accessory 40 is held to the camera control unit 205 by the second communication.

In S605, the camera control unit 205 receives the presence or absence of the optical information of the intermediate accessory 40 from the intermediate accessory 30, and the flow shifts to S606.

In S606, the camera control unit 205 determines the intermediate accessory (also referred to as a first intermediate accessory) including the optical information of the other intermediate accessory.

In a case where the intermediate accessory control unit 309 holds the optical information of the intermediate accessory 40, the flow shifts to S607, and the camera control unit 205 determines that the intermediate accessory 30 is the first intermediate accessory.

In a case where the intermediate accessory control unit 309 does not hold the optical information of the intermediate accessory 40, the flow shifts to S608. The camera control unit 205 determines that the intermediate accessory 40 is the first intermediate accessory, and the optical information of the intermediate accessory 30 is held.

Even in a case where three or more intermediate accessories are attached, it is possible to similarly determine the first intermediate accessory. For example, in a case where three accessories are attached, the processing similar to S602 to S605 is performed between two accessories among the three accessories. When the first intermediate accessory is found, the flow shifts to S609.

When the flow shifts to S609, the camera control unit 205 transmits a presence/absence reply request (third instruction information) of the identification information of the first intermediate accessory and the optical information (fourth information) determined in S607 or S608 to the lens control unit 113 by the first communication. In other words, an enquiry on whether or not the optical information of the first intermediate accessory is held in the interchangeable lens is made.

In S610, when the lens control unit 113 receives the identification information of the first intermediate accessory and the optical information presence/absence reply request, the flow shifts to S611, and the information on whether or not the optical information of the first intermediate accessory is held is transmitted to the camera control unit 205 by the first communication.

In S612, the camera control unit 205 receives the presence or absence of the optical information of the first intermediate accessory from the interchangeable lens 10, and the flow shifts to S613. It is determined whether or not the lens control unit 113 holds the optical information of the first intermediate accessory. With this configuration, the first accessory is determined. In other words, the (first) accessory that holds the optical information of all other accessories is determined.

In a case where the camera control unit 205 determines that the lens control unit 113 holds the optical information of the first intermediate accessory, the flow shifts to S615. In this case, it is determined that the interchangeable lens 10 is the first accessory, and the optical information of the intermediate accessory 30 and the optical information of the intermediate accessory 40 are held in the interchangeable lens. When the camera control unit 205 determines that the lens control unit 113 does not hold the optical information of the first intermediate accessory, the flow shifts to S614.

In S614, the camera control unit 205 determines that the first intermediate accessory is the first accessory.

When the first accessory is confirmed in S614 or S615, the flow shifts to S616, and the camera control unit 205 stores the identification information and an accessory type of the first accessory. When the first accessory is stored, the flow shifts to S617, and the sub-process S307 ends.

Effects of the First Exemplary Embodiment

As described above, according to the first exemplary embodiment, the first communication path in which the camera and the interchangeable lens can perform the communication and the second communication path in which the camera and the accessory can perform the communication are independently provided. Subsequently, the unit that corrects the optical information of the interchangeable lens is determined on the basis of the identification information and the correction processing necessity/unnecessity information of the intermediate accessory of each of the units obtained by the communications using the respective communication paths. With this configuration, while the optical information of the interchangeable lens is appropriately corrected, it is possible to perform the communication at the more appropriately intended timing between the respective units of the imaging apparatus, the interchangeable lens, and the intermediate accessory.

Second Exemplary Embodiment

According to the first exemplary embodiment, the method of correcting the optical information of the interchangeable lens on the basis of the optical information of the intermediate accessory in the activation sequence immediately after the interchangeable lens is attached has been described. According to a second exemplary embodiment, a method of correcting the optical information of the interchangeable lens in a case where the optical system of the accessory dynamically changes when the operation member included in the accessory is operated will be described.

Examples in which the optical system of the accessory dynamically changes when the operation member included in the intermediate accessory is operated include the magnification varying lens in which a magnification is variable, an ND filter in which a transmittance is variable, and the like.

According to the second exemplary embodiment, when the interchangeable lens is attached and the current optical system is confirmed, the processing described according to the first exemplary embodiment is executed. With this configuration, it is assumed that the camera control unit 205 understands the unit that holds the optical information of all the accessories among the interchangeable lens 10, the camera main body 20, the intermediate accessory 30, and the intermediate accessory 40. Hereinafter, the above-described unit that holds the optical information of all the accessories will be described as a first unit.

In addition, it is assumed that the camera control unit 205 recognizes the accessory in which the optical system may dynamically change on the basis of the identification information of the accessory obtained by the operation as described according to the first exemplary embodiment.

Hereinafter, an accessory in which the optical information dynamically changes and the correction processing necessity/unnecessity information is "necessary" will be represented as a dynamic accessory. An intermediate accessory in which the optical information does not dynamically change and the correction processing necessity/unnecessity information is "necessary" will be referred to as a static intermediate accessory. An interchangeable lens in which the optical information dynamically changes will be referred to as a dynamic lens, and an interchangeable lens in which the optical information does not dynamically change will be referred to as a static lens.

It should be noted that the example in which the intermediate accessory 30 and the intermediate accessory 40 are attached between the camera main body 20 and the interchangeable lens 10 has been described according to the present exemplary embodiment, but the present exemplary embodiment can also be adopted even in a case where only one of the intermediate accessories is attached.

Figure 7:
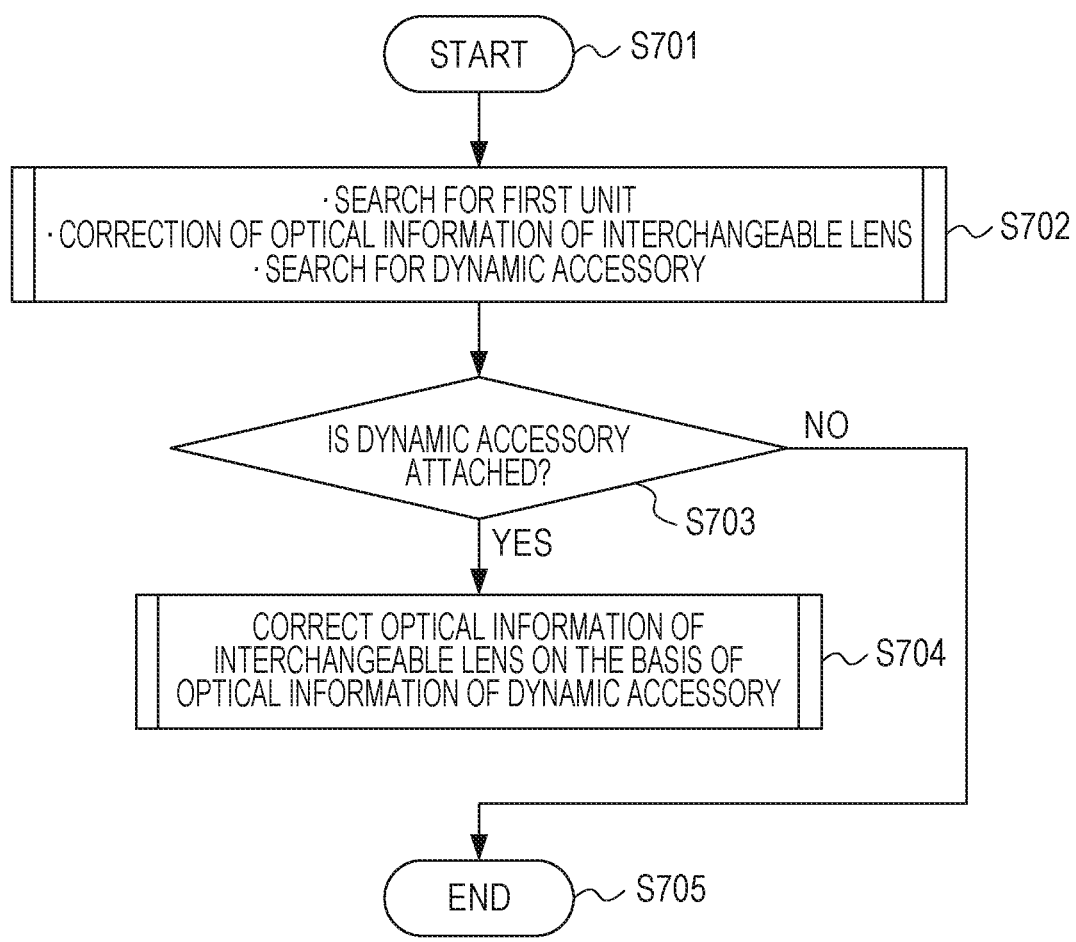
FIG. 7 is a flow chart illustrating a flow of processing for searching for a dynamic accessory according to a second exemplary embodiment.

Dynamic Accessory Search Processing (FIG. 7)

FIG. 7 illustrates a relationship between the first exemplary embodiment and the present exemplary embodiment. In S701, the camera system is activated, and the flow shifts to S702.

In S702, the camera control unit 205 executes the processing described with reference to FIG. 3. That is, for example, the initial communication, the determination of the first unit, and the correction of the optical information of the interchangeable lens are executed. In this initial communication, the interchangeable lens 10, information corresponding to whether or not the optical system dynamically changes (will be also referred to as dynamic accessory information) is obtained from the intermediate accessories 30 and 40. For example, with regard to the information on whether or not the optical system dynamically changes, a transmission request is transmitted to the accessory from the camera control unit 205 at a timing when the identification information is obtained in S402 of FIG. 4 or S502 or S509 of FIG. 5, and the accessory transmits the dynamic accessory information in accordance with the transmission request. A configuration may also be adopted in which the authentication information is included in the dynamic accessory information, and the camera control unit 205 may obtain the authentication information including the dynamic accessory information as a response with respect to the transmission request of the authentication information which has been transmitted to the accessory. It should be noted that the camera control unit 205 may also determine whether or not this is the dynamic accessory on the basis of the identification information obtained in S702 without separately obtaining the dynamic accessory information. In this case, a configuration may also be adopted in which the memory (not illustrated) of the camera control unit 205 includes information (such as a table) indicating a correspondence relationship corresponding to whether or not the identification information of the accessory and the optical system dynamically change. With this configuration, the camera control unit 205 can determine whether or not the accessory is the dynamic accessory on the basis of the identification information of the accessory.

When the sub-process S702 is ended, the flow shifts to S703.

In S703, the camera control unit 205 determines whether or not the dynamic accessory is attached on the basis of the above-described dynamic accessory information. More specifically, in a case where the information indicating that the optical system dynamically changes is obtained as the dynamic accessory information from any one of the accessories, the camera control unit 205 determines that the dynamic accessory is attached. On the other hand, in a case where the information indicating that the optical system dynamically changes is not obtained as the dynamic accessory information, the camera control unit 205 determines that the dynamic accessory is not attached. When the dynamic accessory is attached, the flow shifts to S704.

In S704, the camera control unit 205 executes the sub-process for correcting the optical information of the interchangeable lens on the basis of the change of the optical information of the dynamic accessory. Since the optical information of the interchangeable lens does not need to be corrected in a case where the dynamic accessory is not attached or a case where the dynamic accessory is not operated, the flow shifts to S705, and the optical correction processing of the interchangeable lens is ended.

Figure 8:
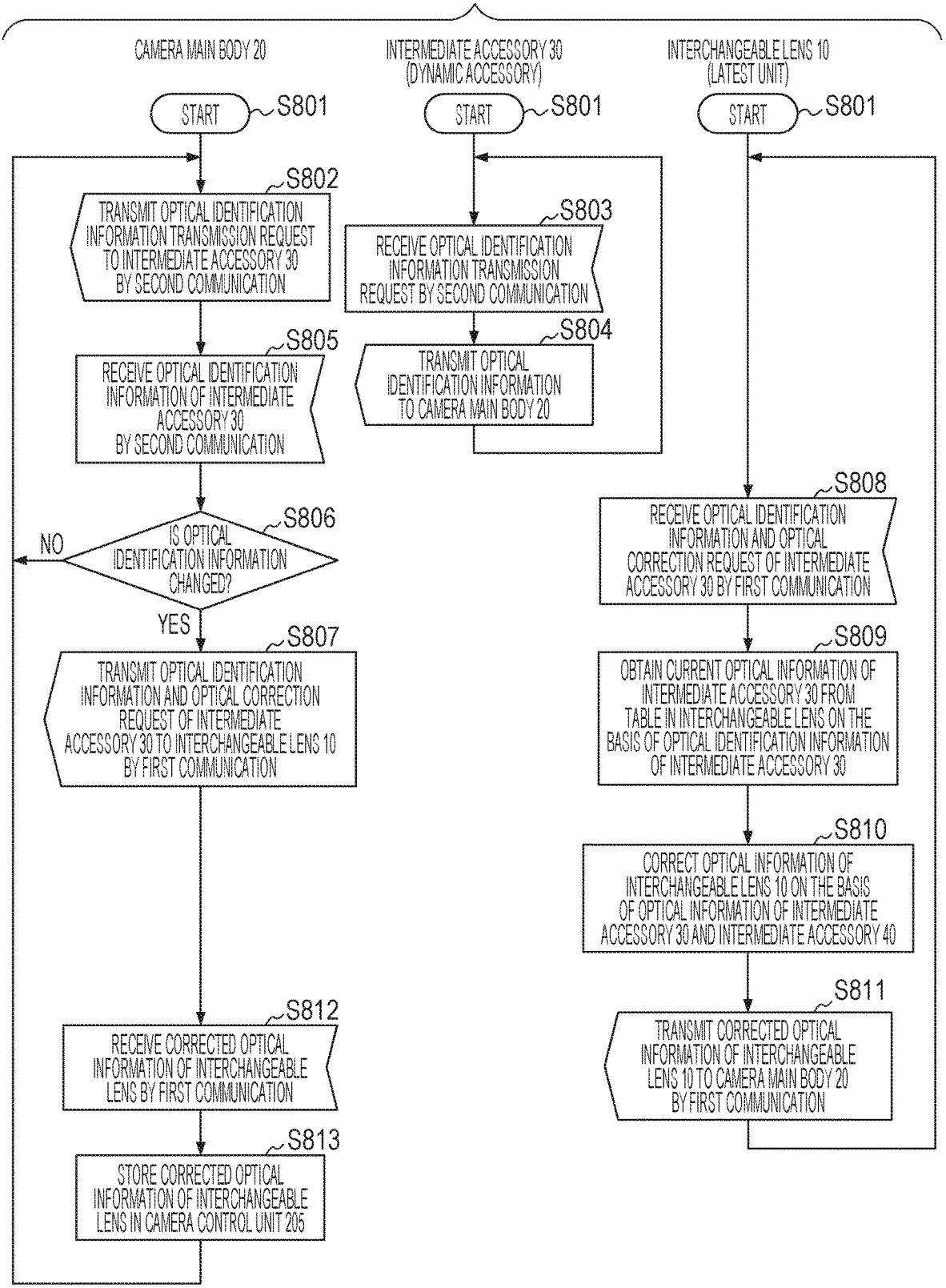
FIG. 8 is a flow chart illustrating a flow of correction processing of optical information in accordance with an operation of the dynamic accessory according to the second exemplary embodiment.

Optical Information Correction Processing in Accordance with the Operation of the Dynamic Accessory (FIG. 8)

Hereinafter, the sub-process S704 for correcting the optical information of the interchangeable lens on the basis of the change of the optical information in accordance with the operation of the dynamic accessory according to the second exemplary embodiment of the present invention will be described with respect to FIG. 8.

In the sub-process illustrated in FIG. 8, the descriptions will be provided while it is set that the camera control unit 205 and the lens control unit 113 recognize that the intermediate accessory 30 is the dynamic accessory, the interchangeable lens 10 is the first unit and also the static lens, and the intermediate accessory 40 is the static intermediate accessory. That is, the camera control unit 205 and the lens control unit 113 recognize as described above in S702 of FIG. 7.

The sequence starts in S801, and the flow shifts to S802.

In S802, the camera control unit 205 transmits the optical data identification information transmission request to the intermediate accessory control unit 309 of the intermediate accessory 30 corresponding to the dynamic accessory by the second communication.

In S803, when the intermediate accessory control unit 309 receives the optical data identification information transmission request, the flow shifts to S804, and optical data identification information is transmitted to the camera control unit 205 via the second communication.

It is assumed that the optical data identification information of the dynamic accessory is information related to the parameter for the correction of the optical information of the interchangeable lens 10 and is, for example, current optical information according to the present exemplary embodiment. For example, in a case where the intermediate accessory includes the magnification varying lens, the information is current magnification information. In a case where, for example, the intermediate accessory includes the ND filter, the information is information for correcting a current optical path length. It should be noted that any optical data identification information may be used as long as the first unit can recognize an optical state of the dynamic accessory. In addition, the information may be information obtained by adding information of a plurality of possible states to the information such as the model number (ID) used for identifying the type (model) or optical data identification information indicating the optical data that dynamically changes. Moreover, the information may also include information indicating a function that the accessory has or information such as a manufacturing number (serial number) with which it is possible to identify an individual piece among the same model.

In S805, the camera control unit 205 receives the optical data identification information, and the flow shifts to S806.

In S806, the camera control unit 205 determines if the optical information of the intermediate accessory 30 is changed on the basis of the optical data identification information. For example, the optical information of the intermediate accessory 30 which is received in the initial communication in S702 is compared with the optical data identification information received in S805. In a case where the optical information is not changed, the flow returns to S802. After elapse of a predetermined period of time, the camera control unit 205 transmits the optical data identification information transmission request again.

In S806, in a case where the camera control unit 205 determines that the optical information of the intermediate accessory 30 is changed, the flow shifts to S807 where processing for performing a correction of optical information of an optical lens is performed.

It should be noted that, as a method for the camera control unit 205 to recognize the change of the optical information of the dynamic accessory, the presence or absence of the change of the optical information may be received by way of polling by performing the communication with the dynamic accessory at a constant cycle as in S802, S803, S804, S805, and S806. In addition, an interruption signal from the dynamic accessory may be received when the optical information of the dynamic accessory changes. For example, it is assumed that the intermediate accessory 30 corresponding to the dynamic accessory includes an operation member configured to change the optical information of the intermediate accessory 30. In this case, when it is detected that the operation member is operated, the interruption signal may be transmitted from the intermediate accessory control unit 309 which will be described below to the camera control unit 205. In addition, S802, S803, S804, and S805 may be executed after the camera control unit 205 receives the interruption signal from the intermediate accessory control unit 309 and determines that the optical data identification information is changed in S806.

The optical data identification information on which the change is reflected may be exchanged as in S802, S803, S804, and S805, or the camera control unit 205 may be notified of only the change of the optical data identification information, and the camera control unit 205 may calculate the current optical data identification information to start the exchange.

When the flow shifts to S807, the camera control unit 205 transmits the optical data identification information of the intermediate accessory 30 and the correction request of the optical information of the interchangeable lens 10 (will be also referred to as an optical correction request) to the lens control unit 113 of the interchangeable lens 10 which serves as the first unit by the first communication.

In S808, when the lens control unit 113 receives the optical data identification information of the intermediate accessory 30 and the optical correction request, the flow shifts to S809.

In S809, the lens control unit 113 obtains the current optical information of the intermediate accessory 30 from the table in the lens control unit 113 on the basis of the optical data identification information of the intermediate accessory 30, and the flow shifts to S810.

In S810, the optical information of the interchangeable lens 10 is corrected on the basis of the optical information of the intermediate accessory 40 corresponding to the static intermediate accessory obtained in the sub-process S702 and the optical information of the intermediate accessory 30.

When the correction is completed, in S811, the lens control unit 113 transmits the corrected optical information of the interchangeable lens 10 to the camera control unit 205 by the first communication.

In S812, the optical information of the interchangeable lens which is corrected by the camera control unit 205 is received, and the flow shifts to S813 where the optical information is stored in the camera control unit 205.

When S813 is ended, the flow returns to S802, and the change of the optical information of the dynamic accessory is monitored again.

According to the present exemplary embodiment, the case has been described where one of the intermediate accessories is the dynamic accessory, and the intermediate accessory 10 is the first unit. The correction processing can be also similarly performed in a case where a plurality of dynamic accessories are used and a case where the first unit is a unit other than the interchangeable lens.

In a case where only the first unit is the dynamic accessory, when the first unit recognizes that effect, the optical correction may be performed in a stage where the first unit recognizes that its own optical information is changed, and the optical data of the interchangeable lens 10 after the optical correction may be transmitted to the camera main body 20.

The correction processing of the optical information of the interchangeable lens 10 is performed by taking into account not only the optical information of the dynamic accessory obtained in S805, but also the optical information of the static intermediate accessory as in the optical information of the intermediate accessory 40 in S810. In a case where the static intermediate accessory is attached, the correction may be previously performed on the basis of the optical information of the static intermediate accessory, and the final correction processing may be performed on the basis of the optical information of the dynamic accessory when the optical information dynamically changes.

Effects of the Second Exemplary Embodiment

As described above, according to the second exemplary embodiment, the change of the optical information of the intermediate accessory 30 is detected by the camera control unit 205. Then, the camera main body 20 transmits the information related to the change of the optical information and the correction request of the optical information of the interchangeable lens 10 to the lens control unit 113. Subsequently, the lens control unit 113 corrects the optical information of the interchangeable lens 10 to be transmitted to the camera control unit 205.

With this configuration, even in a case where the optical information of the accessory dynamically changes, it is possible to appropriately correct the optical information of the interchangeable lens.

Third Exemplary Embodiment

According to the first exemplary embodiment, the case has been described where the first unit that performs the correction of the optical information of the interchangeable lens is determined when the camera control unit 205 determines the presence or absence of the optical information of the other unit on the basis of the identification information of the unit. According to a third exemplary embodiment, a case where the unit that performs the correction of the optical information of the interchangeable lens is previously determined will be described.

An example in which the unit that performs the correction of the optical information of the interchangeable lens is previously determined includes the following case. That is, for example, when the attachment of the accessory of which optical information is not held by the camera is detected on the basis of the identification information of the accessory, the camera requests a user for firmware update, and the optical information of the accessory is obtained by the firmware update. In this case, the camera performs the correction of the optical information of the interchangeable lens.

According to the third exemplary embodiment, it is previously determined that the camera performs the correction of the optical information of the interchangeable lens. Even in a case where it is previously determined that the interchangeable lens or a particular intermediate accessory preforms the correction of the optical information of the interchangeable lens, processing similar to the third exemplary embodiment may be performed.

In addition, in a case where the optical characteristics of the accessory dynamically changes as in the second exemplary embodiment, it is possible to reduce the communication amount by setting the accessory as the unit that performs the correction of the optical information of the interchangeable lens.

Figure 9:
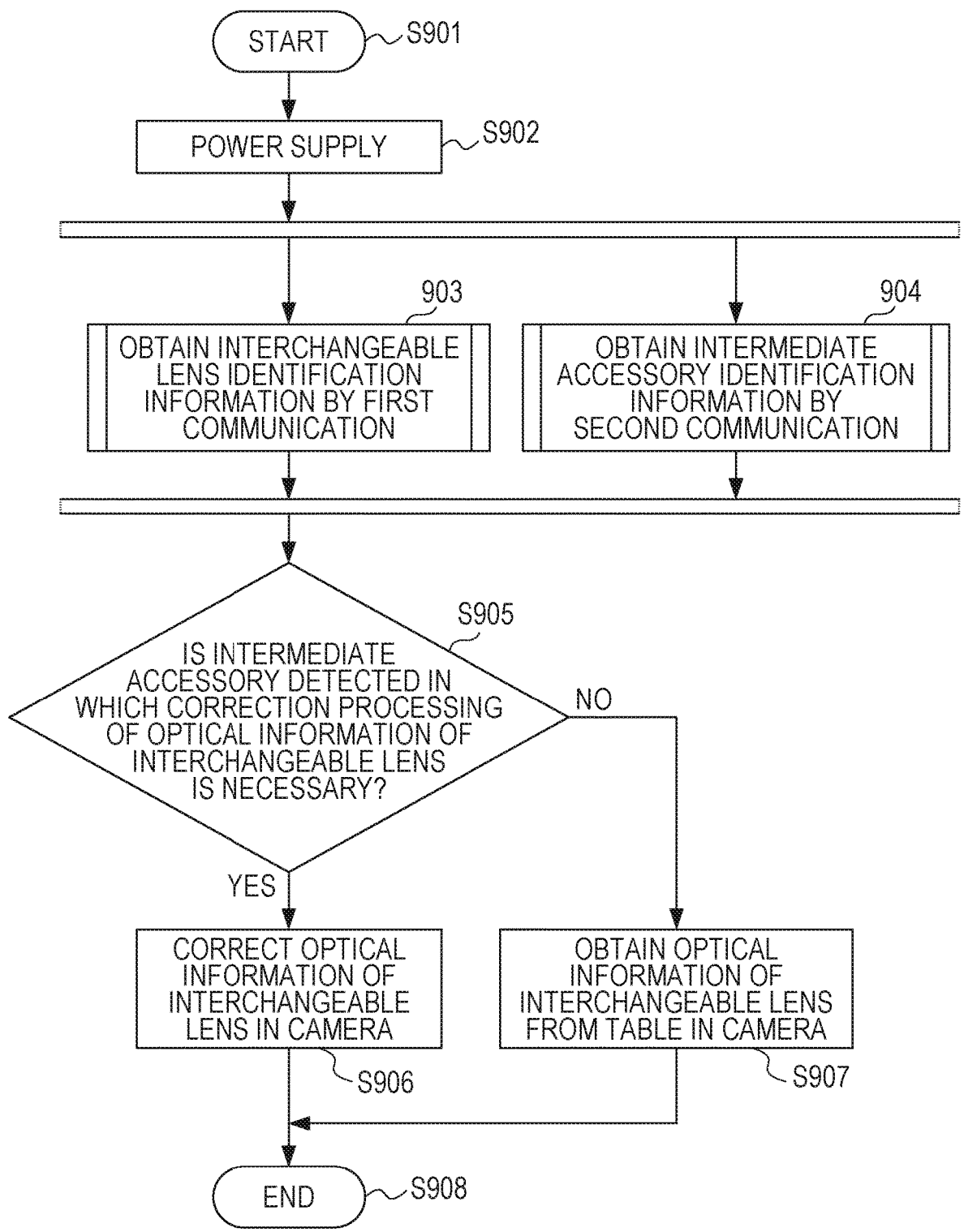
FIG. 9 is a flow chart illustrating a flow of processing for obtaining the optical information according to a third exemplary embodiment.

Corrected Optical Information Obtaining Processing According to the Second Exemplary Embodiment (FIG. 9)

FIG. 9 illustrates a flow of processing for the camera main body 20 to obtain the optical information of the interchangeable lens 10 which is corrected on the basis of the optical information of the intermediate accessory 30, and the intermediate accessory 40, when power is supplied for the first time since the intermediate accessory and the interchangeable lens are attached.

In S901, the camera main body 20 is activated, and the flow shifts to S902.

When the flow shifts to S902, the camera main body 20 supplies power to the interchangeable lens 10, the intermediate accessory 30, and the intermediate accessory 40 via the mount contact points for the power supply which are not illustrated in the drawings, and the flow shifts to S903 and S904.

The sub-process S903 corresponding to the initial communication processing with the interchangeable lens 10 by the first communication is similar to the sub-process S303 according to the first exemplary embodiment. The sub-process S904 corresponding to the initial communication processing with the accessory by the second communication is similar to the sub-process S304 according to the first exemplary embodiment.

S903 and S904 may be performed in parallel or may also be sequentially performed since the different communication paths are used.

The identification information of the interchangeable lens and the accessory authentication information are obtained in S903 and S904, and the flow shifts to S905.

When the flow shifts to S905, the camera control unit 205 determines whether or not the intermediate accessory in which the correction processing of the optical information of the interchangeable lens is necessary exists on the basis of the intermediate accessory identification information obtained in S904. In a case where the intermediate accessory in which the correction processing of the optical information of the interchangeable lens is necessary is attached, the flow shifts to S906.

When the flow shifts to S906, the camera control unit 205 performs the correction of the optical information of the interchangeable lens by using the optical information of the interchangeable lens and the optical information of the intermediate accessory which are held by itself.

On the other hand, in S905, in a case where the intermediate accessory is not attached or all the attached intermediate accessories are the intermediate accessories in which the correction processing of the optical information of the interchangeable lens is unnecessary, the flow shifts to S907 since the correction processing is unnecessary.

In S907, the camera control unit 205 obtains the optical information from the data table stored by itself.

After the optical information is obtained in S906 or S907, the flow shifts to S908, and the optical information obtaining sequence is ended.

As described above, in the camera system independently including the first communication path in which the camera and the interchangeable lens can perform the communication and the second communication path in which the camera and the intermediate accessory can perform the communication, it is possible to appropriately correct the optical information of the interchangeable lens on the basis of the optical information of the intermediate accessory.

Similarly, the interchangeable lens may previously determine that the correction of its own optical information is performed on the basis of the information of the intermediate accessory. In this case, the camera may obtain only the identification information of the intermediate accessory by the initial communication and notifies the interchangeable lens of the identification information. The interchangeable lens that has received the notification determines whether or not the correction of the optical information can be performed on the basis of the identification information of the intermediate accessory.

In a case where the correction can be performed, the camera is notified of the corrected optical information of the interchangeable lens. In a case where the correction is not performed, the camera is notified of that effect, and the camera that has received the notification takes a predetermined action for urging the user to perform firmware update of the interchangeable lens, for example. In this manner, it is possible to appropriately correct the optical information of the interchangeable lens on the basis of the optical information of the intermediate accessory.

After the optical information is obtained, the first communication path is used for the communication for the camera main body 20 to control the interchangeable lens 10, and the second communication path is used for the camera main body 20 to regularly obtain the operation information of the intermediate accessory operation member 310 and the intermediate accessory operation member 410. Either the first communication path or the second communication path may be used as the communication for regularly obtaining the operation information of the lens operation member 116 of the interchangeable lens by taking the occupancies of the respective communication paths and the immediacy used for the communication and the control into account.

Effects of the Third Exemplary Embodiment

As described above, according to the exemplary embodiment, the correction of the optical information of the interchangeable lens 10 is performed in the camera main body 20. That is, it is unnecessary to determine by which unit the correction of the optical information is to be performed according to the third exemplary embodiment. For this reason, according to the third exemplary embodiment, the processing time can be shortened as compared with the first exemplary embodiment.

Fourth Exemplary Embodiment

According to the present exemplary embodiment, a case will be described where the optical data identification information is used as the intermediate accessory identification information.

In a case where the accessory identification information is information intrinsic to the product such as the model number, when a newly-introduced accessory has an optical system similar to an already-known accessory or even the accessory can be corrected by a correction method similar to that for the already-known accessory, a new model number is allocated. For this reason, the newly-introduced accessory becomes an accessory that is not to be corrected from the viewpoint of the already-known accessory.

In view of the above, according to the present exemplary embodiment, optical data identification information is used as the accessory identification information. According to the present exemplary embodiment, the accessory identification information is associated with the correction method. For example, a combination of the information corresponding to correction method and the information corresponding to correction parameter is set as optical data identification information. The information related to the correction method according to the present exemplary embodiment is information corresponding to the optical member of the intermediate accessory, and the information related to the parameter for the correction is information corresponding to the optical information of the intermediate accessory based on optical characteristics of the optical member. The above-described identification information will be hereinafter referred to as correction identification information. A case where the intermediate accessory is a magnification varying system including a magnification varying lens will be used as an example. In the case of this example, the information related to the correction method is information indicating the magnification varying lens, and the information related to the parameter for the correction is information is magnification information of the magnification varying lens.

The lens control unit 113 may be configured to store the information related to the correction method and the information related to the correction parameter while being associated with each other. When other information is needed for the correction of the optical information, this information may also be stored while being associated with the information related to the correction method and the information related to the correction parameter.

In this manner, when the information related to the correction method and the information related to the correction parameter are transmitted to the lens control unit 113 via the camera control unit 205, even when the intermediate accessory in which the correction is taken into account having information related to a different correction parameter is newly needed, it is possible to perform the correction by the already-used unit by setting the information related to the correction parameter (the magnification value, for example) again.

When the optical data identification information is used as described above, it is possible to correct the optical information of the interchangeable lens by taking into account the optical characteristics of the accessory. For example, in a case where the optical system similar to the already-known product is provided or the accessory is an accessory that can be corrected by a method similar to that of the already-known product, even if the model number (ID) is not identified, it is possible to correct the optical information of the interchangeable lens.

In a case where the correction identification information is used, since it is not efficient to store a correction algorithm in each unit, a unit that executes the correction is preferably previously determined. According to the present exemplary embodiment, the correction method of the interchangeable lens in a case where the unit that executes the correction is previously determined as the interchangeable lens and also the correction identification information is used will be described. Even in a case where the correction is performed by the first unit as in the first and second exemplary embodiments, it is possible to similarly use the correction identification information.

Figure 11:
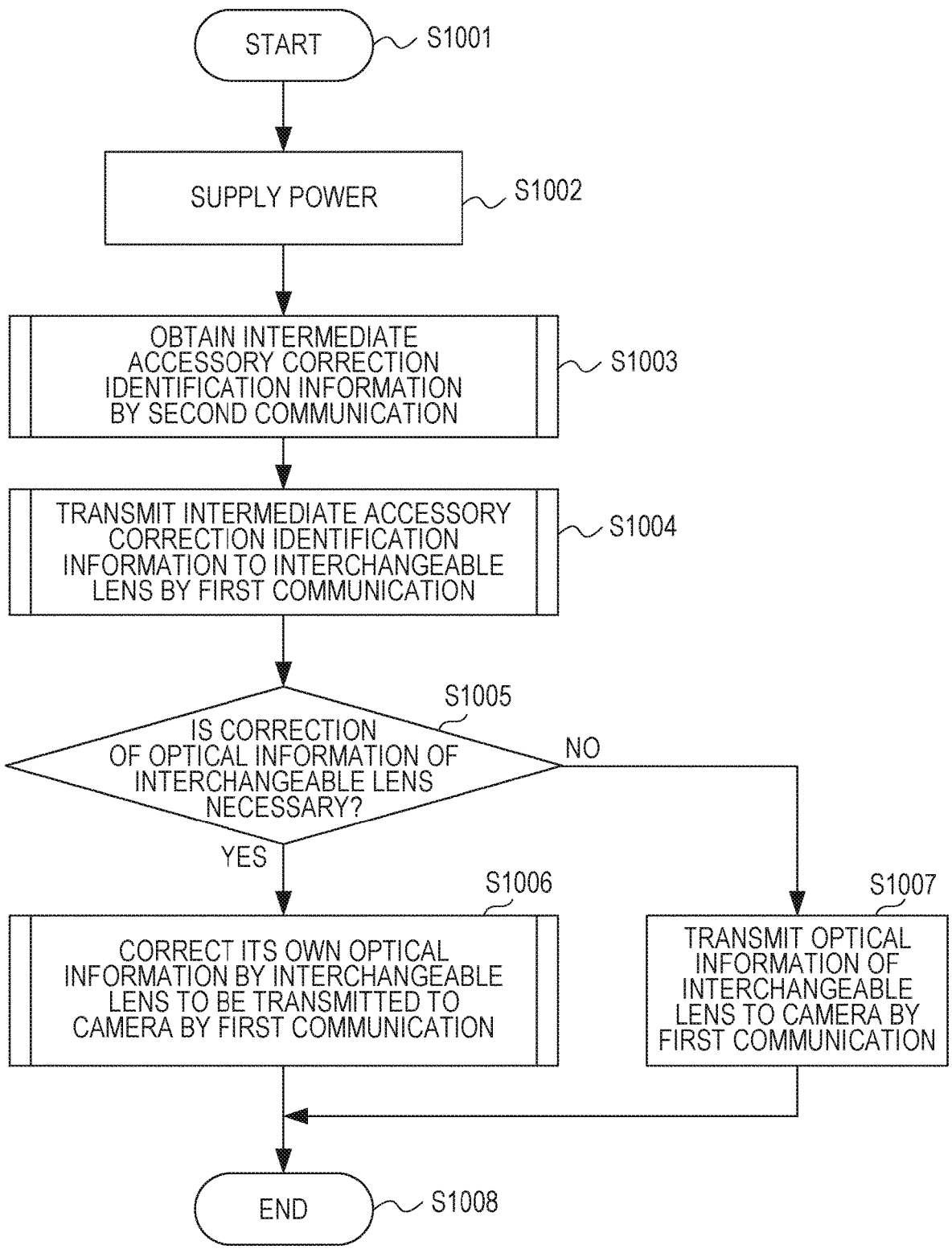
FIG. 11 is an explanatory diagram for describing the correction processing of the optical information in accordance with correction identification information according to a fourth exemplary embodiment.

Obtaining Processing for the Corrected Optical Information According to a Fourth Exemplary Embodiment (FIG. 11)

FIG. 11 illustrates a flow of the following processing. That is, when power is supplied for the first time after the intermediate accessory and the interchangeable lens are attached, correction information of the intermediate accessory 30 and the intermediate accessory 40 is obtained. The correction information is transmitted to the interchangeable lens 10 for requesting for the correction, and the corrected optical information of the interchangeable lens 10 is obtained.

The camera control unit 205 is activated in S1001, and the flow shifts to S1002.

When the flow shifts to S1002, the camera control unit 205 supplies power to the interchangeable lens 10, the intermediate accessory 30, and the intermediate accessory 40 via mount contact points for power supply which are not illustrated in the drawing, and the flow shifts to S1003.

Sub-process S1003 corresponding to the initial communication processing with the accessory by the second communication is substantially similar to sub-process S304 according to the first exemplary embodiment. In S1003, the above-described correction identification information is obtained as the identification information of the intermediate accessory. Herein, the correction processing necessity/unnecessity information is obtained as described according to the first exemplary embodiment, and the camera control unit 205 may further obtain the correction identification information in a case where the correction processing necessity/unnecessity information is "necessary". In S1003, correction identification information of the accessory is obtained, and the flow shifts to S1004.

When the flow shifts to S1004, the camera control unit 205 transmits the intermediate accessory correction identification information obtained in S1003 to the interchangeable lens control unit 113 and requests for the correction of the optical information. The interchangeable lens obtains the correction identification information of the intermediate accessory, and the flow shifts to S1005.

When the flow shifts to S1005, the interchangeable lens control unit 113 determines whether or not the correction of its own optical information is necessary on the basis of the intermediate accessory correction identification information. In a case where the intermediate accessory in which the correction of the optical information is necessary is attached, the flow shifts to S1006.

When the flow shifts to S1006, the interchangeable lens control unit 113 corrects its own optical information based on the intermediate accessory correction identification information and transmits the corrected optical information to the camera.

In S1007, the interchangeable lens control unit 113 transmits its own optical information to the camera.

The transmission timing of the optical information in S1006 and S1007 may be immediately after the correction completion or a timing requested by the camera. After the optical information is obtained in S1006 or S1007, the flow shifts to S1008, and the optical information obtaining sequence ends.

In this manner, the optical information of the interchangeable lens can be appropriately corrected on the basis of the optical information of the intermediate accessory in the camera system independently including the first communication path where the camera and the interchangeable lens can perform the communication and the second communication path where the camera and the intermediate accessory can perform the communication.

In addition, according to the first exemplary embodiment, the example in which the authentication information of the accessory includes the identification information of the accessory and the correction processing necessity/unnecessity information has been described. In contrast to this, the identification information of the accessory may include only the correction processing necessity/unnecessity information, and the correction processing necessity/unnecessity information may be separately obtained in a case where the correction processing necessity/unnecessity information indicates that the correction is "necessary". With this configuration, as compared with the case where the correction identification information is obtained irrespective of the necessity/unnecessity indicated by the correction processing necessity/unnecessity information, it is possible to reduce the communication amount in a case where the correction processing necessity/unnecessity information indicates that the correction is "unnecessary". In this case, similarly as in the exemplary embodiment described above, both the intermediate accessory identification information and the correction processing necessity/unnecessity information are obtained. That is, in a case where the correction processing necessity/unnecessity information indicates that the correction is "necessary" and the correction identification information is separately obtained, both the intermediate accessory identification information and the correction identification information are obtained as the information for identifying the accessory. With this configuration, it is possible to reduce the communication amount in a case where the correction processing necessity/unnecessity information indicates that the correction is "unnecessary", and also the intermediate accessory identification information can be used for another purpose irrespective of a state in which the correction processing necessity/unnecessity information indicates that the correction is "necessary" or "unnecessary".

In addition, in a case where it is determined that the lens control unit 113 does not store the information related to the correction method on the basis of the information related to the correction method included in the correction identification information, control may be performed in a manner that the optical information correction of the interchangeable lens 10 is not performed. Advantages of the fourth exemplary embodiment As described above, the camera control unit 205 obtains the information related to the correction method and the information related to the correction parameter from the intermediate accessory control unit 309 and transmits these pieces of information to the lens control unit 113. With this configuration, even when the accessory is a new accessory but the correction method is already found, the lens control unit 113 can perform the correction of the optical information by taking into account the accessory.

Other Exemplary Embodiments

It should be noted that, according to the above-described first exemplary embodiment, the descriptions have been made while the first accessory is set as the accessory that holds the optical information of all the other accessories among the accessories related to the correction. However, the first accessory may be the accessory that has the most number of pieces of mutual optical information among the accessories related to the correction. That is, the accessory that does not have the optical information may exist. In this case, the missing optical information may be obtained from another unit.

In addition, in the initial communication according to the above-described first exemplary embodiment, the lens control unit 113 transmits the identification information of the interchangeable lens 10 in S404 and S520. Herein, for example, the identification information transmitted in S520 may be identification information indicating that this is not an intermediate accessory.

Moreover, in the initial communication of FIG. 5 according to the above-described first exemplary embodiment, the respective accessories transmit plural pieces of information to the camera control unit 205 as the authentication information, but only necessary information may be transmitted. In this case, the camera specifies the necessary information and transmits information requests to the respective accessories.

Furthermore, according to the above-described first exemplary embodiment, the case where the number of intermediate accessories is two has been described. In a case where the number of intermediate accessories is three or more, the intermediate accessory that has all the optical information of the other intermediate accessories or the most number of pieces of optical information among the plurality of intermediate accessories is set as the first intermediate accessory.

According to the second exemplary embodiment, the dynamic accessory may perform the correction of the optical information of the interchangeable lens 10. In this case, the dynamic accessory may obtain the optical information of the other accessory in advance. In a case where the dynamic accessory corrects the optical information of the interchangeable lens 10, the corrected optical information is transmitted to the camera main body 20.

According to the second exemplary embodiment, in a case where a plurality of first accessories are used, the dynamic accessory may perform the correction of the optical information of the interchangeable lens 10.

According to the third exemplary embodiment, the case where the correction of the optical information of the interchangeable lens 10 is performed in the camera main body 20 has been described. In contrast to this, the correction of the optical information may be performed in the interchangeable lens 10. In this case, instead of S906 of FIG. 9, the camera control unit 205 transmits a request for performing the correction of the optical information of the interchangeable lens 10 to the lens control unit 113. At this time, in a case where the optical information of the intermediate accessory in which the correction is necessary is insufficient, the interchangeable lens 10 may obtain the optical information of the intermediate accessory from the camera main body 20 or the intermediate accessory if needed.

According to the fourth exemplary embodiment, the example has been described in which the camera control unit 205 obtains the information the correction method and the information related to the correction parameter from the intermediate accessory control unit 309 and transmits these pieces of information to the lens control unit 113. Herein, in a case where the intermediate accessory 30 is a dynamic intermediate accessory described according to the second exemplary embodiment and the information related to the correction parameter may change, the information related to the correction parameter may be obtained again in accordance with the detection of the change. That is, in a case where it is detected that the operation member of the intermediate accessory 30 is operated, the camera control unit 205 may obtains the information related to the correction parameter from the intermediate accessory control unit 309 and transmit the information to the lens control unit 113.

It should be noted that the above-described respective exemplary embodiments may be appropriately combined with each other.

The present invention can also be realized while a program that realizes one or more functions according to the above-described exemplary embodiment is supplied to a system or an apparatus via a network or a storage medium, and one or more processors in a computer of the system or the apparatus read the program to execute processing. Furthermore, the present invention can be realized by a circuit that realizes the one or more functions (for example, an application specific integrated circuit (ASIC)).

The exemplary embodiments of the present invention have been described, but the present invention is not limited to these exemplary embodiments, and various modifications and alterations can be made within a scope of the invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-108271 filed May 31, 2017 and Japanese Patent Application No. 2018-090216 filed May 8, 2018, which are hereby incorporated by reference herein in their entirety.

What is claimed is:

1. An imaging apparatus to which an interchangeable lens and an intermediate accessory, which is attachable between the interchangeable lens and the imaging apparatus, are attachable, the imaging apparatus comprising:
at least one processor and at least one memory coupled to each other and to perform operations including:
controlling, as a first communication control, a first communication via a first communication path where it is possible to mutually communicate with the interchangeable lens,
controlling, as a second communication control, a second communication via a second communication path where it is possible to mutually communicate with the intermediate accessory,
obtaining information from the interchangeable lens and the intermediate accessory,
storing the obtained information, and
determining, as an optical correction hardware, a device from among the imaging apparatus, the interchangeable lens, and the intermediate accessory which performs a correction of optical information of the interchangeable lens,
wherein the first communication control is configured to transmit first instruction information to the interchangeable lens via the first communication path and, as a response, obtain first information including identification information of the interchangeable lens from the interchangeable lens,
wherein the second communication control is configured to transmit second instruction information to the intermediate accessory via the second communication path ands a response, obtain second information including identification information of the intermediate accessory and information indicating whether or not the correction of the optical information of the interchangeable lens is necessary, and
wherein determining includes determining the optical correction hardware, from among the imaging apparatus, the interchangeable lens, and the intermediate accessory which performs the correction of the optical information of the interchangeable lens based on the first information and the second information.

2. The imaging apparatus according to claim 1, wherein the second communication control also is configured to mutually communicate with the interchangeable lens, and
wherein, to obtain information, the second instruction information also is transmitted to the interchangeable lens, and, as a response, information indicating a termination of the second communication is obtained from the interchangeable lens.

3. The imaging apparatus according to claim 2, wherein the second instruction information includes the identification information of the intermediate accessory, the information indicating whether or not the correction of the optical information of the interchangeable lens is necessary, and information for requesting the information indicating the termination of the second communication.

4. The imaging apparatus according to claim 1, wherein determining includes determining that the optical information of the interchangeable lens is corrected in the imaging apparatus in a case where storing includes storing the optical information of the interchangeable lens of which the first information is obtained and optical information of the intermediate accessory of which the second information is obtained.

5. The imaging apparatus according to according to claim 4, wherein, in a case where storing does not include storing the optical information of the interchangeable lens of which the first information is obtained and the optical information of the intermediate accessory of which the second information is obtained, determining includes determining that the correction of the optical information of the interchangeable lens is performed in an accessory having the most number of pieces of optical information among plurality of accessories including the intermediate accessory and the interchangeable lens.

6. The imaging apparatus according to according to claim 3, wherein the first communication control is further configured to transmit, to the interchangeable lens, third instruction information, for requesting third information indicating presence or absence of identification information and optical information of a first intermediate accessory, and, in response to the transmission of the third instruction information, obtaining includes obtaining the third information from the interchangeable lens.

7. The imaging apparatus according to claim 6, wherein determining includes determining that the optical information of the interchangeable lens is corrected in the interchangeable lens in a case where the second communication control obtains, from the interchangeable lens as the third information, information indicating the presence of the optical information of the first intermediate accessory.

8. The imaging apparatus according to claim 6, wherein determining includes determining that the optical information of the interchangeable lens is corrected in the interchangeable lens in a case where the second communication control obtains, from the interchangeable lens as the third information, information indicating the absence of the optical information of the first intermediate accessory.

9. The imaging apparatus according to according to claim 6, wherein the first intermediate accessory and a second intermediate accessory are attached to the imaging apparatus and, in a case where the second communication control transmits requesting instruction information for requesting, as the third information, information indicating the presence or the absence of optical information of the second intermediate accessory, the first intermediate accessory is an accessory that receives, in response to the transmission of the requesting instruction information, information indicating that the second communication control has the optical information of the second intermediate accessory as the third information.

10. The imaging apparatus according to according to claim 1, wherein, in a case where determining includes determining that the correction of the optical information of the interchangeable lens is performed in one accessory of a plurality of accessories including the interchangeable lens and the intermediate accessory, the second communication control transmits instruction information for requesting the correction of the optical information of the interchangeable lens to the one accessory.

11. The imaging apparatus according to according to claim 1, wherein, in a case where the second communication control obtains information indicating that the correction of the optical information of the interchangeable lens is not necessary, determining includes determining that the optical information of the interchangeable lens is not corrected.

12. An intermediate accessory detachably attachable to the imaging apparatus according to claim 1,
wherein the second information is transmitted to the imaging apparatus as a response with respect to the second instruction information received from the imaging apparatus via the second communication path.

13. An interchangeable lens attachable to an intermediate accessory, which is attachable to an imaging apparatus, the interchangeable lens comprising:
at least one processor and at least one memory coupled to each other and to perform operations including:
controlling, as a first communication control, a first communication via a first communication path where it is possible to mutually communicate with the imaging apparatus,
controlling, as a second communication control, a second communication via a second communication path where it is possible to mutually communicate with the imaging apparatus via the intermediate accessory, and
storing identification information of the interchangeable lens and optical information of the interchangeable lens,
wherein the first communication control is configured to transmit information including the identification information of the interchangeable lens, to the imaging apparatus in response to first instruction information obtained from the imaging apparatus, and
wherein the second communication control is configured to transmit, in response to second instruction information obtained from the imaging apparatus, information indicating that a relevant accessory from among a plurality of accessories including the interchangeable lens and the intermediate accessory is a termination of the second communication.

14. The interchangeable lens according to claim 13,
the operations further including correcting the optical information of the interchangeable lens,
wherein correcting includes correcting the optical information of the interchangeable lens based on optical information of the intermediate accessory stored in a case where third instruction information for instructing the correction of the optical information of the interchangeable lens in the interchangeable lens is obtained from the imaging apparatus, and
wherein the first communication control transmits the corrected optical information to the imaging apparatus in response to the third instruction information.

15. The interchangeable lens according to claim 14,
wherein the second instruction information includes information for requesting information indicating whether or not the correction of the optical information of the interchangeable lens is necessary, and
wherein the second communication control transmits information indicating that the correction of the optical information of the interchangeable lens is not necessary to the imaging apparatus in a case where the second instruction information is obtained.

16. The interchangeable lens according to claim 13, wherein the first instruction information includes information for requesting the identification information of the interchangeable lens.

17. The interchangeable lens according to claim 13, wherein the second instruction information includes information for requesting information indicating whether or not a relevant accessory, among the plurality of accessories and that has obtained the second instruction information, is a termination of the second communication.

18. An intermediate accessory attachable between an imaging apparatus and an interchangeable lens, the intermediate accessory comprising:
at least one processor and at least one memory coupled to each other and to perform operations including: controlling a communication via a communication path where it is possible to mutually communicate with the imaging apparatus, and
storing identification information and optical information of the intermediate accessory,
wherein controlling includes transmitting, to the imaging apparatus by the controlled communication, the identification information of the intermediate accessory and information indicating whether or not a correction of optical information of the interchangeable lens is necessary in response to first instruction information obtained from the imaging apparatus.

19. The intermediate accessory according to claim 18, wherein information indicating that the correction of the optical information of the interchangeable lens is not necessary is transmitted as a response with respect to second instruction information obtained from the imaging apparatus.

20. The intermediate accessory according to claim 18, the operations further including correcting the optical information of the interchangeable lens,
wherein correcting includes correcting stored optical information of the interchangeable lens in a case where third instruction information indicating that the stored optical information of the interchangeable lens is to be corrected in the intermediate accessory is obtained from the imaging apparatus, and wherein the corrected optical information is transmitted to the imaging apparatus in response to the third instruction information.

21. The intermediate accessory according to claim 18, wherein the first instruction information includes information for requesting information indicating whether or not there is a termination of the controlled communication, and wherein controlling includes transmitting information indicating that there is no termination of the controlled communication in response to the first instruction information.

22. The intermediate accessory according to claim 18, the operations further including a switch configured to change a communication state of the controlled communication, wherein controlling includes performing a control to close the switch when the first instruction information is obtained.

23. The intermediate accessory according to claim 22, wherein, in a case where controlling is performed to close the switch and thereafter the first instruction information is obtained, controlling includes not transmitting a response to the first instruction information.

24. The intermediate accessory according to claim 22, wherein controlling includes performing control to open the switch when information indicating that initial communication is to be started is obtained from the imaging apparatus.

25. A control method for an imaging apparatus to which an interchangeable lens and an intermediate accessory, which is attachable between the interchangeable lens and the imaging apparatus, are attachable, the control method comprising:
   controlling, as a first communication control, a first communication via a first communication path where it is possible to mutually communicate with the interchangeable lens;
   controlling, as a second communication control, a second communication via a second communication path where it is possible to mutually communicate with the intermediate accessory;
   obtaining information from the interchangeable lens and the intermediate accessory;
   storing the obtained information; and
   determining, as an optical correction hardware, a device from among the imaging apparatus, the interchangeable lens, and the intermediate accessory which performs a correction of optical information of the interchangeable lens,
   wherein the first communication control is configured to transmit first instruction information to the interchangeable lens via the first communication path and, as a response, obtain first information including identification information of the interchangeable lens from the interchangeable lens,
   wherein the second communication control is configured to transmit second instruction information to the intermediate accessory via the second communication path and, as a response, obtain second information including identification information of the intermediate accessory and information indicating whether or not the correction of the optical information of the interchangeable lens is necessary, and
   wherein determining includes determining the optical correction hardware, from among the imaging apparatus, the interchangeable lens, and the intermediate accessory which performs the correction of the optical information of the interchangeable lens based on the first information and the second information.

26. A control method for an interchangeable lens attachable to an intermediate accessory, which is attachable to an imaging apparatus, the control method comprising:
   controlling, as a first communication control, a first communication via a first communication path where it is possible to mutually communicate with the imaging apparatus;
   controlling, as a second communication control, a second communication via a second communication path where it is possible to mutually communicate with the imaging apparatus via the intermediate accessory; and
   storing identification information of the interchangeable lens and optical information of the interchangeable lens,
   wherein the first communication control is configured to transmit information, including the identification information of the interchangeable lens, to the imaging apparatus in response to first instruction information obtained from the imaging apparatus, and
   wherein the second communication control is configured to transmit, in response to second instruction information obtained from the imaging apparatus, information indicating that a relevant accessory from among a plurality of accessories including the interchangeable lens and the intermediate accessory is a termination of the second communication.

27. A control method for an intermediate accessory attachable between an imaging apparatus and an interchangeable lens, the control method comprising:
   controlling a communication via a communication path where it is possible to mutually communicate with the imaging apparatus; and
   storing identification information and optical information of the intermediate accessory,
   wherein controlling includes transmitting, to the imaging apparatus by the controlled communication, the identification information of the intermediate accessory and information indicating whether or not a correction of optical information of the interchangeable lens is necessary in response to first instruction information obtained from the imaging apparatus.

28. An imaging apparatus to which an interchangeable lens and an intermediate accessory, which is attachable between the interchangeable lens and the imaging apparatus, are attachable, the imaging apparatus comprising:
   a first communication terminal configured to transmit information to the interchangeable lens;
   a second communication terminal configured to obtain information from the intermediate accessory; and
   at least one processor and at least one memory coupled to each other and to perform operations including:
      obtaining, from the intermediate accessory, information related to a method for a correction of optical information of the interchangeable lens and information related to a parameter for the correction of the optical information of the interchangeable lens, and
      transmitting, to the interchangeable lens via the first communication terminal, the information related to the method for the correction and the information related to the parameter for the correction.

29. The imaging apparatus according to claim 28, wherein indication information indicating whether or not the correction of the optical information of the interchangeable lens is necessary is obtained from the intermediate accessory via the second communication terminal, and wherein the information related to the method for the correction and the information related to the parameter for the correction are obtained in a case where the indication information is information indicating that the correction of the optical information of the interchangeable lens is necessary.

30. The imaging apparatus according to claim 28, wherein the information related to the method for the correction is information corresponding to an optical member included in the intermediate accessory.

31. The imaging apparatus according to claim 30, wherein the information related to the parameter for the correction is information corresponding to an optical characteristic based on the optical member.

32. The imaging apparatus according to claim 28,
wherein the information related to the method for the correction is information corresponding to a configuration in which the intermediate accessory includes a magnification varying lens, and
wherein the information related to the parameter for the correction is information corresponding to a magnification based on the magnification varying lens.

33. An intermediate accessory which is attachable between an imaging apparatus and an interchangeable lens, the intermediate accessory comprising:
a first communication terminal through which information transmitted from the imaging apparatus to the interchangeable lens passes;
a second communication terminal configured to transmit a response with respect to a request received from the imaging apparatus; and
at least one processor and at least one memory coupled to each other and to perform operations including:
transmitting, to the imaging apparatus via the second communication terminal, information related to a method for a correction of optical information of the interchangeable lens and information related to a parameter for the correction of the optical information of the interchangeable lens, and
causing the information related to the method for the correction and the information related to the parameter for the correction to pass through the first communication terminal.

34. The intermediate accessory according to claim 33, wherein transmitting includes transmitting the information related to the method for the correction and the information related to the parameter for the correction via the first communication terminal as a response with respect to a request received in accordance with transmission, via the first communication terminal, of information corresponding to necessity of the correction as information corresponding to whether or not the correction of the optical information of the interchangeable lens is necessary.

35. The intermediate accessory according to claim 33, wherein the information related to the method for the correction is information corresponding to an optical member included in the intermediate accessory.

36. The intermediate accessory according to claim 35, wherein the information related to the parameter for the correction is information corresponding to an optical characteristic based on the optical member.

37. The intermediate accessory according to claim 33,
wherein the information related to the method for the correction is information corresponding to a configuration in which the intermediate accessory includes a magnification varying lens, and
wherein the information related to the parameter for the correction is information corresponding to a magnification based on the magnification varying lens.

38. An interchangeable lens which is attachable to an intermediate accessory attached to an imaging apparatus, the interchangeable lens comprising:
a first communication terminal configured to receive information transmitted from the imaging apparatus;
a third communication terminal configured to transmit information to the imaging apparatus; and
at least one processor and at least one memory coupled to each other and to perform operations including:
receiving, via the first communication terminal, information related to a method for a correction of optical information of the interchangeable lens and information related to a parameter for the correction of the optical information of the interchangeable lens,
correcting optical information based on the information related to the method for the correction and the information related to the parameter for the correction, and
transmitting the corrected optical information via the third communication terminal.

39. The interchangeable lens according to claim 38, wherein the information related to the method for the correction is information corresponding to an optical member included in the intermediate accessory.

40. The interchangeable lens according to claim 39, wherein the information related to the parameter for the correction is information corresponding to an optical characteristic based on the optical member.

41. The interchangeable lens according to claim 38,
wherein the information related to the method for the correction is information corresponding to a configuration in which the intermediate accessory includes a magnification varying lens, and
wherein the information related to the parameter for the correction is information corresponding to a magnification based on the magnification varying lens.

42. A control method for an imaging apparatus to which an interchangeable lens and an intermediate accessory, which is attachable between the interchangeable lens and the imaging apparatus, are attachable, wherein the imaging apparatus includes a first communication terminal configured to transmit information to the interchangeable lens, and a second communication terminal configured to obtain information from the intermediate accessory, the control method comprising:
obtaining, from the intermediate accessory via the second communication terminal and in accordance with transmission of information for requesting information related to a method for a correction of optical information of the interchangeable lens and information related to a parameter for the correction of the optical information of the interchangeable lens, the information related to the method for the correction and the information related to the parameter for the correction; and
transmitting, to the interchangeable lens via the first communication terminal, the information related to the method for the correction and the information related to the parameter for the correction.

43. A control method for an intermediate accessory which is attachable between an imaging apparatus and an interchangeable lens, wherein the intermediate accessory includes a first communication terminal through which information transmitted from the imaging apparatus to the interchangeable lens passes, and a second communication terminal configured to transmit a response with respect to a request received from the imaging apparatus, the control method comprising:

transmitting, to the imaging apparatus via the second communication terminal, information related to a method for a correction of optical information of the interchangeable lens and information related to a parameter for the correction of the optical information of the interchangeable lens; and causing the information related to the method for the correction and the information related to the parameter for the correction to pass through the first communication terminal.

44. A control method for an interchangeable lens which is attachable to an intermediate accessory attached to an imaging apparatus, wherein the interchangeable lens includes a first communication terminal configured to receive information is-transmitted from the imaging apparatus, and a third communication terminal configured to transmit information to the imaging apparatus, the control method comprising:

receiving, via the first communication terminal, information related to a method for a correction of optical information of the interchangeable lens and information related to a parameter for the correction of the optical information of the interchangeable lens;

correcting optical information based on the information related to the method for the correction and the information related to the parameter for the correction; and transmitting the corrected optical information via the third communication terminal.

45. The imaging apparatus according to claim 28, wherein transmitting includes transmitting the information related to the method for the correction and the information related to the parameter for the correction via a third communication terminal.

46. The imaging apparatus according to claim 28, wherein receiving includes receiving lens information to be corrected via the second communication terminal.

47. The imaging apparatus according to claim 46, wherein the operations further include correcting the received lens information based on the information related to the method for the correction and the information related to the parameter for the correction.

48. The intermediate accessory according to claim 33, wherein the information related to the method for the correction and the information related to the parameter for the correction transmitted from the imaging apparatus pass through a third communication terminal.

49. The intermediate accessory according to claim 33, wherein lens information to be corrected transmitted from the interchangeable lens passes through the second communication terminal.

50. The intermediate accessory according to claim 33, wherein a clock signal transmitted from the imaging apparatus passes through the first communication terminal, wherein information transmitted from the interchangeable lens passes through the second communication terminal, and wherein information transmitted from the imaging apparatus passes through a third communication terminal.

\* \* \* \* \*